United States Patent
Yamakami et al.

(10) Patent No.: US 9,191,143 B2
(45) Date of Patent: Nov. 17, 2015

(54) OPTICAL TRANSMISSION DEVICE AND OPTICAL TRANSMISSION DEVICE CONTROL METHOD

(71) Applicant: FUJITSU LIMITED, Kawasaki-shi, Kanagawa (JP)

(72) Inventors: Masahiro Yamakami, Fukuoka (JP); Makoto Yoshimi, Kasuga (JP); Yoshiyuki Maeda, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 14/096,751

(22) Filed: Dec. 4, 2013

(65) Prior Publication Data

US 2014/0233943 A1 Aug. 21, 2014

(30) Foreign Application Priority Data

Feb. 21, 2013 (JP) ................. 2013-032481

(51) Int. Cl.
*H04J 14/02* (2006.01)
*H04B 10/079* (2013.01)
*H04B 10/50* (2013.01)
*H04B 10/564* (2013.01)

(52) U.S. Cl.
CPC ...... *H04J 14/0221* (2013.01); *H04B 10/07955* (2013.01); *H04B 10/506* (2013.01); *H04B 10/564* (2013.01)

(58) Field of Classification Search
CPC ........ H04B 10/07955; H04J 14/0201–14/0221
See application file for complete search history.

(56) References Cited

U.S. PATENT DOCUMENTS 8,391,711 B2 * 3/2013 Iwasawa et al. ................ 398/62
2005/0158057 A1 * 7/2005 Tomofuji et al. ............. 398/160
2009/0116834 A1 5/2009 Sugawa et al.

FOREIGN PATENT DOCUMENTS

JP 2009-117970 5/2009
JP 2009-253426 10/2009

* cited by examiner

*Primary Examiner* — David Payne
*Assistant Examiner* — Casey Kretzer
(74) *Attorney, Agent, or Firm* — Staas & Halsey LLP

(57) ABSTRACT

Each optical transmission device includes a detecting unit, a notifying unit, and a control unit. The detecting unit detects a value of the optical power of each of multiple wavelengths. The notifying unit notifies an optical transmission device at the upstream side of a control frame that includes the value and that includes information that indicates the execution state of the optical power control. The control unit calculates the adjustment level on the basis of the optical power of each of the wavelengths detected by the detecting unit. Furthermore, when the information included in the control frame sent from an optical transmission device at the downstream side indicates that the optical power control is being stopped, the control unit calculates the adjustment level on the basis of the value included in the control frame and executes optical power control by setting the calculated adjustment level to the optical device.

4 Claims, 15 Drawing Sheets

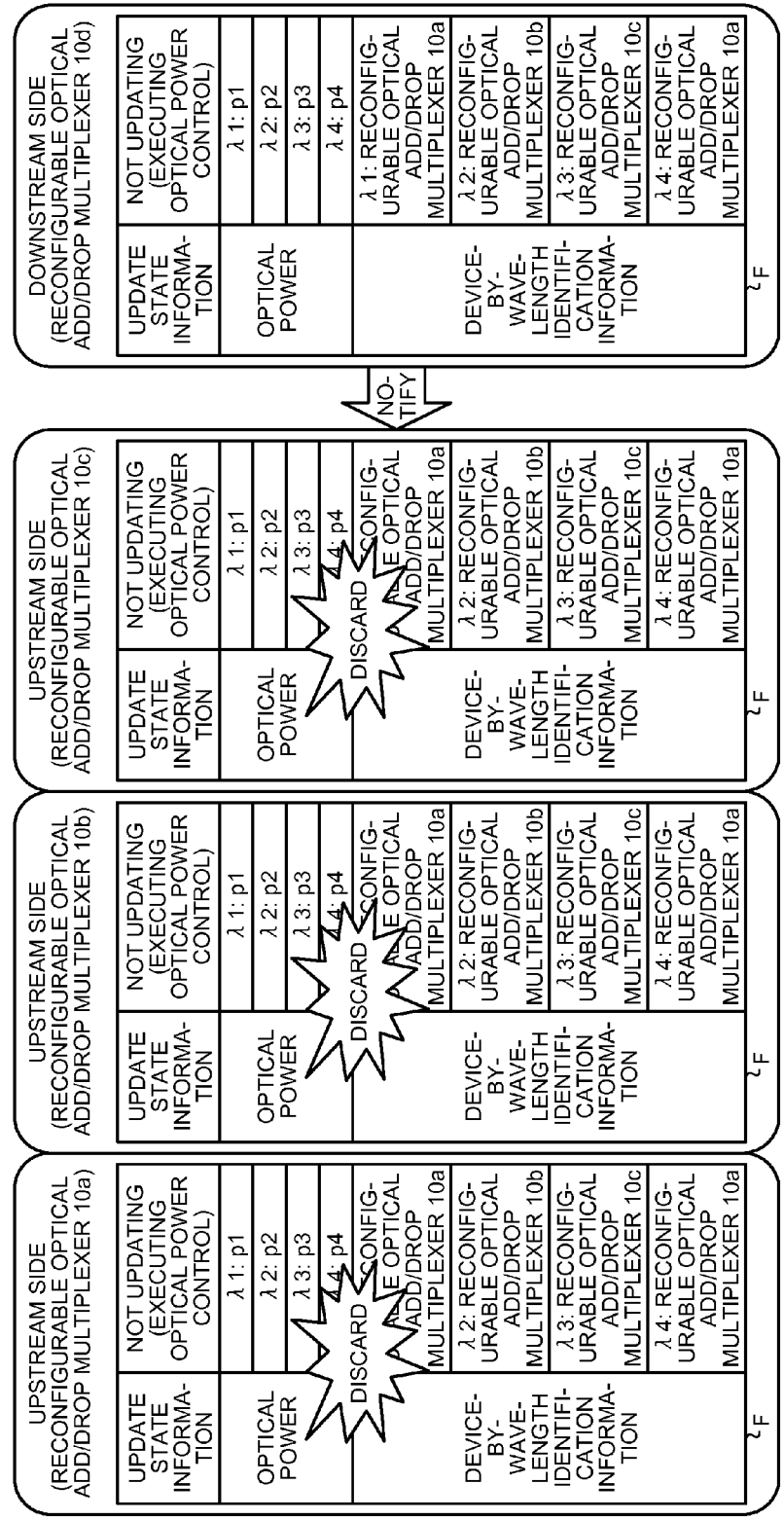

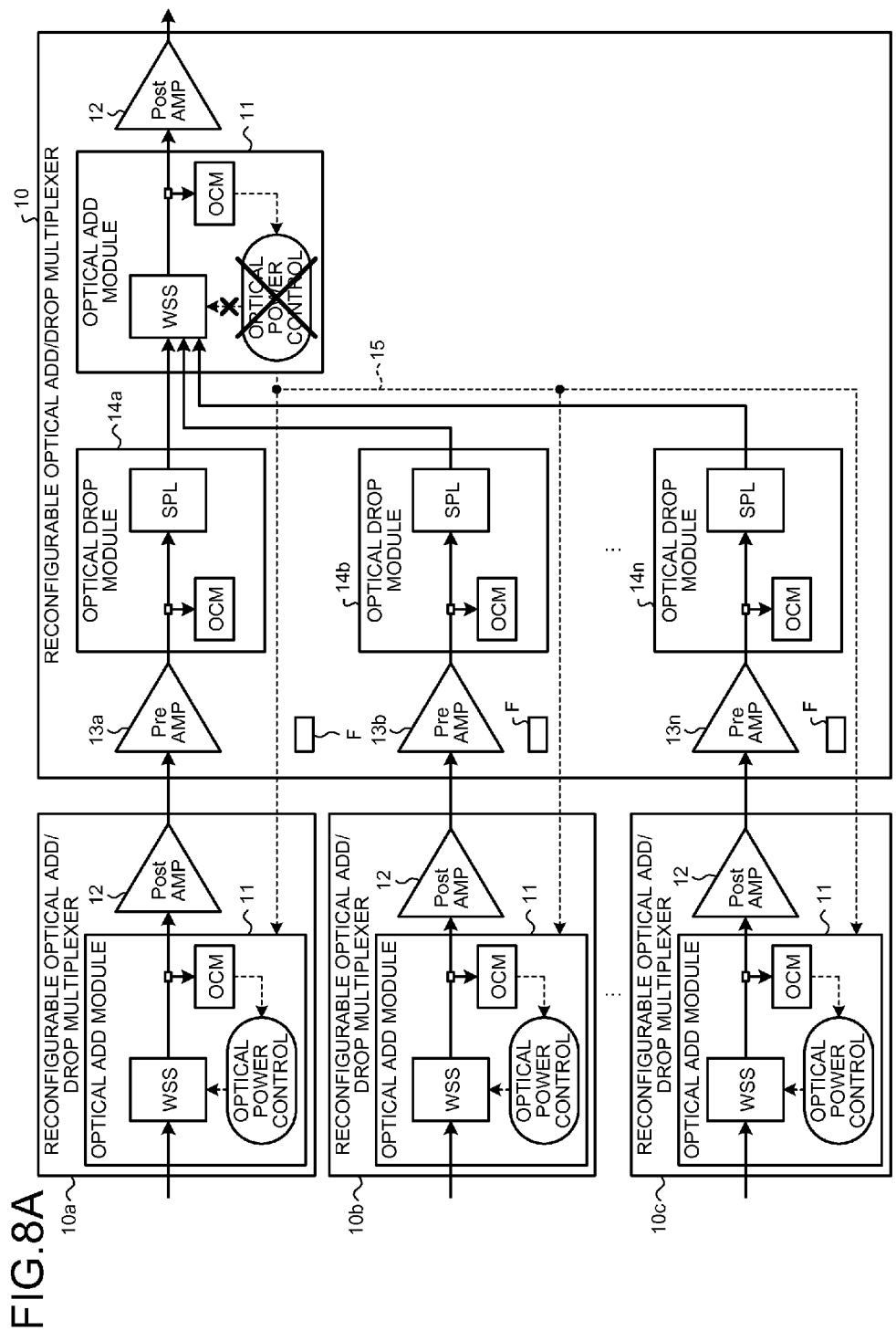

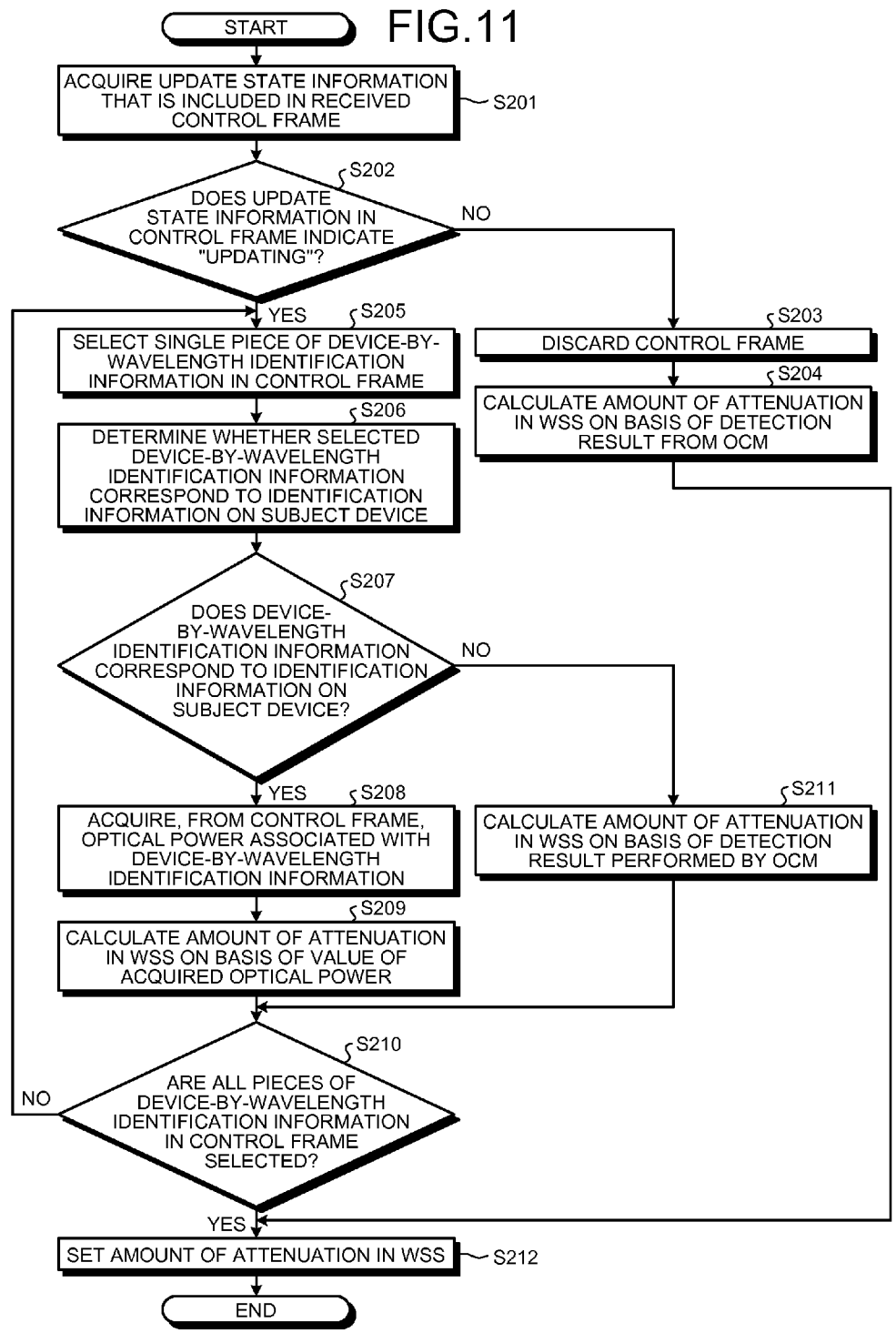

OPTICAL TRANSMISSION DEVICE AND OPTICAL TRANSMISSION DEVICE CONTROL METHOD

CROSS-REFERENCE TO RELATED APPLICATION

This application is based upon and claims the benefit of priority of the prior Japanese Patent Application No. 2013-032481, filed on Feb. 21, 2013, the entire contents of which are incorporated herein by reference.

FIELD

The embodiment discussed herein is related to an optical transmission device and an optical transmission device control method.

BACKGROUND

In recent years, with the increase in communication channel capacity and communication distances, there have been developments to increase the capacity of and the distance covered by networks. For backbone networks, in order to implement an increase in the capacity of and the distance covered by networks, studies have been conducted on an optical network (hereinafter, referred to as a "WDM network") that uses wavelength division multiplex (WDM). The WDM network uses an optical transmission device, which is called a reconfigurable optical add/drop multiplexer (ROADM), that adds an arbitrary wavelength to wavelength multiplexed light, which is targeted for transmission, and drops an arbitrary wavelength from the wavelength multiplexed light.

The reconfigurable optical add/drop multiplexer includes a monitor, such as an optical channel monitor (OCM) or the like, that detects the value of the optical power of each wavelength in the wavelength multiplexed light that is targeted for transmission. Furthermore, the reconfigurable optical add/drop multiplexer includes a control mechanism that controls the adjustment level of the optical device such that the value of optical power of each wavelength matches the target value on the basis of the detection result obtained by the monitor. The control mechanism is implemented by, for example, firmware.

Consequently, in the reconfigurable optical add/drop multiplexer, if the control mechanism is rebooted when the firmware is updated, the control performed by the optical device that adjusts optical power of each wavelength is stopped, which may possibly make communication unstable.

In contrast, there is a known technology in which a control mechanism backs up the adjustment level, which was set in the optical device before the control performed by the optical device is stopped, in a storing unit as a fixed value and then continuously sets the adjustment level, which has been backed up as the fixed value, in the optical device in which the control has been stopped.

Patent Document 1: Japanese Laid-open Patent Publication No. 2009-253426
Patent Document 2: Japanese Laid-open Patent Publication No. 2009-117970

However, in the conventional technology, there is a problem in that it is difficult to maintain the stability of communication when control performed by an optical device is stopped.

Specifically, in the conventional technology, because the adjustment level, which is a fixed value, is continuously set in the optical device in which a control is stopped, if the optical power of each wavelength in wavelength multiplexed light varies during the stopping of control that is performed by the optical device, it is difficult to maintain the value of optical power of each wavelength at its target value after the optical power of the wavelength has been changed. Consequently, with the conventional technology, there is a problem in that stability of communication may possibly be prevented from being maintained during the stopping of control that is performed by the optical device.

SUMMARY

According to an aspect of an embodiment, an optical transmission device includes a detecting unit that detects a value of optical power of each of multiple wavelengths in wavelength multiplexed light that is targeted for transmission; a notifying unit that notifies an optical transmission device at an upstream side that has sent signal light of each of the wavelengths of a control frame that includes the value of the optical power of each of the wavelengths detected by the detecting unit and that includes information that indicates an execution state of optical power control that controls an adjustment level set in an optical device that adjusts the optical power of each of the wavelengths; and a control unit that calculates the adjustment level on the basis of the value of the optical power of each of the wavelengths detected by the detecting unit, that calculates, when the information included in the control frame sent from an optical transmission device at a downstream side indicates that the optical power control is being stopped, the adjustment level of the optical power of each of the wavelengths included in the control frame, and that sets the calculated adjustment level to the optical device so that the control unit executes the optical power control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7B is a schematic diagram illustrating the operation example 2 in a case in which the reconfigurable optical add/drop multiplexer at the downstream side notifies the reconfigurable optical add/drop multiplexer at the upstream side of the control frame during normal operation;

FIG. 8A is a schematic diagram illustrating the operation example 2 in a case in which the reconfigurable optical add/drop multiplexer at the downstream side notifies the reconfigurable optical add/drop multiplexer at the upstream side of the control frame when the firmware is being updated;

FIG. 11 is a flowchart illustrating an optical power control process performed by the optical add module according to the embodiment.

DESCRIPTION OF EMBODIMENT

Preferred embodiments of the present invention will be explained with reference to accompanying drawings. The present invention is not limited to the embodiment.

Figure 1:
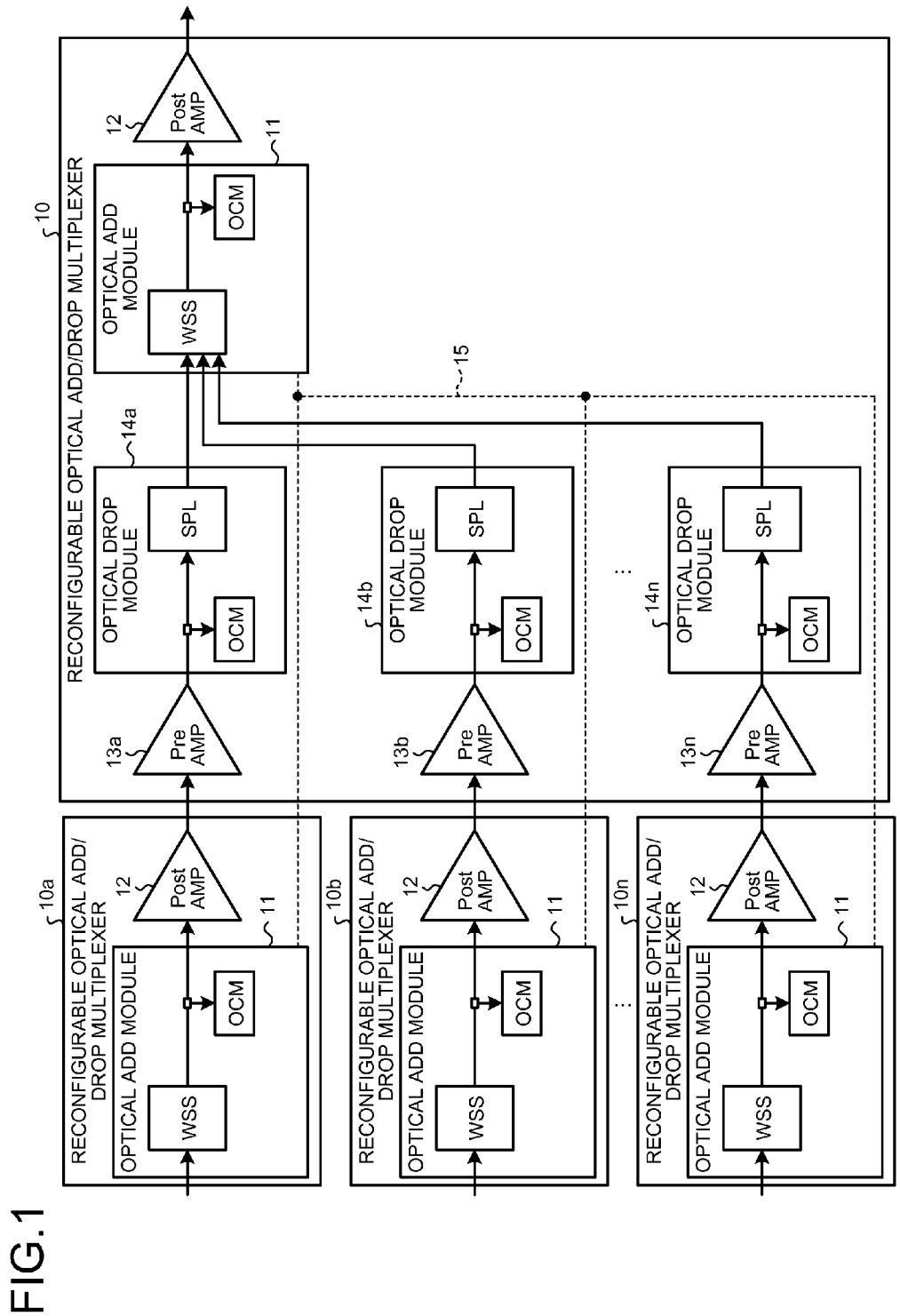
FIG. 1 is a schematic diagram illustrating an example of the configuration of a WDM network that includes a reconfigurable optical add/drop multiplexer according to an embodiment of the present invention.

First, the configuration of a WDM network that includes reconfigurable optical add/drop multiplexers 10a to 10n and 10 according to the embodiment will be described. FIG. 1 is a schematic diagram illustrating an example of the configuration of a WDM network that includes a reconfigurable optical add/drop multiplexer according to an embodiment of the present invention. The WDM network illustrated in FIG. 1 includes the reconfigurable optical add/drop multiplexers 10a to 10n at the upstream side and the reconfigurable optical add/drop multiplexer 10 at the downstream side that is connected to the reconfigurable optical add/drop multiplexers 10a to 10n at the upstream side via a transmission path, such as an optical fiber. The reconfigurable optical add/drop multiplexers 10a to 10n at the upstream side have the same configuration; therefore, in the following, a description will be given of, as an example, only the configuration of the reconfigurable optical add/drop multiplexer 10a at the upstream side.

The reconfigurable optical add/drop multiplexer 10a at the upstream side includes an optical add module 11 and a post amplifier 12. The optical add module 11 is a module that adds a signal light of an arbitrary wavelength to the wavelength multiplexed light that is input from the left side in the drawing and then outputs the signal light to the right side in the drawing. The post amplifier 12 is an amplifier that amplifies the wavelength multiplexed light, which was output by the optical add module 11 to the right side in the drawing, and then outputs the wavelength multiplexed light to the reconfigurable optical add/drop multiplexer 10 that is at the downstream side.

The reconfigurable optical add/drop multiplexer 10 at the downstream side includes preamplifiers 13a to 13n, optical drop modules 14a to 14n, the optical add module 11, and the post amplifier 12.

The preamplifiers 13a to 13n are amplifiers that are provided such that they are associated with the reconfigurable optical add/drop multiplexers 10a to 10n at the upstream side, respectively, and that amplify the wavelength multiplexed light that is input from the reconfigurable optical add/drop multiplexers 10a to 10n at the upstream side, respectively. The optical drop modules 14a to 14n are modules that drop signal light of an arbitrary wavelength from the wavelength multiplexed light that is input from the preamplifiers 13a to 13n and then output, to the optical add module 11, the wavelength multiplexed light that includes signal light of wavelengths that have not been dropped.

The optical add module 11 and the post amplifier 12 have the same configurations as those of the optical add module 11 and the post amplifier 12, respectively, included in each of the reconfigurable optical add/drop multiplexers 10a to 10n at the upstream side. The optical add module 11 is connected to the optical add module 11 that is included in each of the reconfigurable optical add/drop multiplexers 10a to 10n at the upstream side via a communication line 15, such as a local area network (LAN) or the like.

Figure 2:
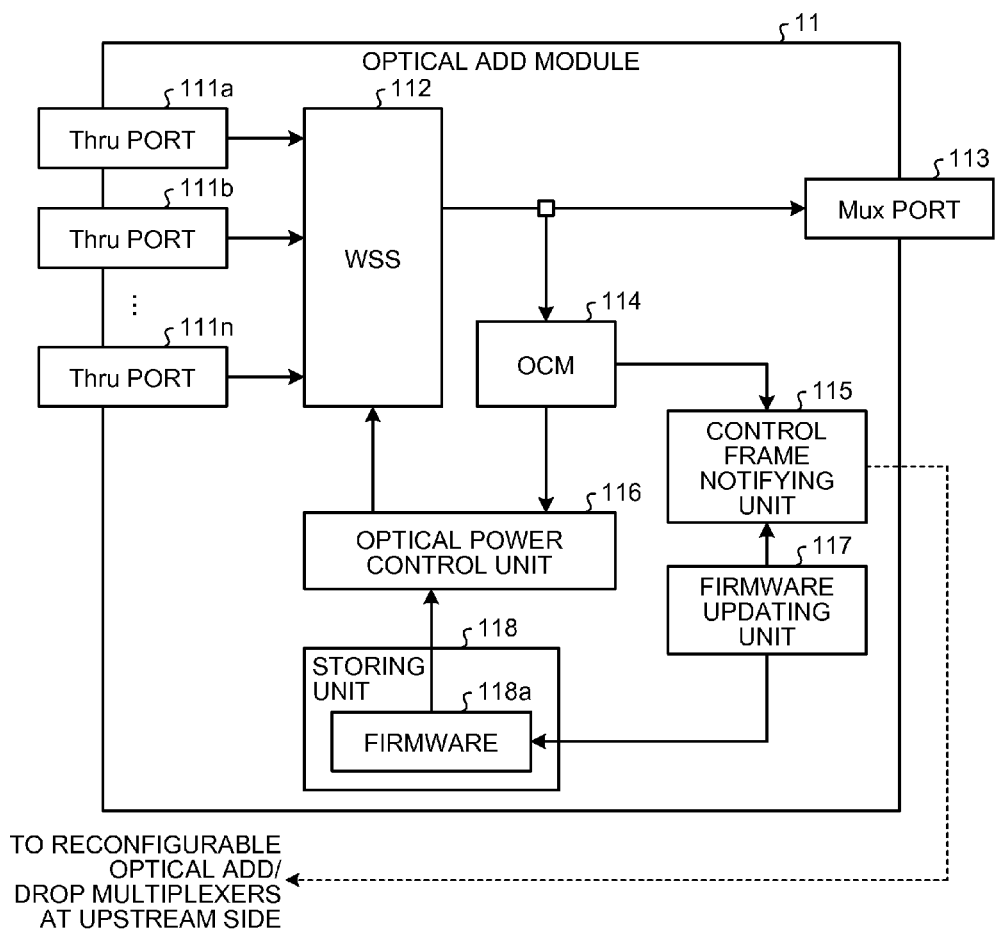
FIG. 2 is a schematic diagram illustrating the configuration of an optical add module according to the embodiment.

In the following, a description will be given of the configuration of the optical add module 11 illustrated in FIG. 1. The optical add module 11 included in each of the reconfigurable optical add/drop multiplexers 10a to 10n at the upstream side has the same configuration as that of the optical add module 11 included in the reconfigurable optical add/drop multiplexer 10 at the downstream side. Accordingly, in the following, a description will be given of the configuration, as an example, of the optical add module 11 that is included in the reconfigurable optical add/drop multiplexer 10 at the downstream side. FIG. 2 is a schematic diagram illustrating the configuration of an optical add module according to the embodiment.

The optical add module 11 illustrated in FIG. 2 includes Thru ports 111a to 111n, a wavelength selective switch (WSS) 112, a Mux port 113, and an optical channel monitor (OCM) 114. Furthermore, the optical add module 11 includes a control frame notifying unit 115, an optical power control unit 116, a firmware updating unit 117, and a storing unit 118.

The Thru ports 111a to 111n are ports that receive the wavelength multiplexed light that is output from each of the optical drop modules 14a to 14n.

The WSS 112 is a device that selects signal light of an arbitrary wavelength from among the wavelengths of the multiplexed light that has been received by the Thru ports 111a to 111n; multiplexes the selected signal light of multiple wavelengths; and then newly creates wavelength multiplexed light that is targeted for transmission.

Furthermore, the WSS 112 attenuates the signal light of each wavelength in the wavelength multiplexed light such that the optical power of each wavelength in the wavelength multiplexed light targeted for the transmission becomes the targeted optical power. The amount of attenuation performed by the WSS 112 is adjusted on the basis of the control executed by the optical power control unit 116, which will be described later. The WSS 112 is an example of an optical device. The amount of attenuation performed by the WSS 112 is an example of the adjustment level of the optical device. A detailed explanation will follow later of the optical power control that controls the amount of attenuation performed by the WSS 112 such that the optical power of each wavelength in the wavelength multiplexed light, which is targeted for transmission, becomes the targeted optical power.

The Mux port 113 is a port that is used to output the wavelength multiplexed light created by the WSS 112 to the post amplifier 12.

The OCM 114 is a monitor that detects the value of the optical power of each of the wavelengths in the wavelength multiplexed light created by the WSS 112 and that outputs, as the detection result, the value of the optical power of each of the detected wavelengths to both the control frame notifying unit 115 and the optical power control unit 116. The OCM 114 is an example of a detecting unit.

The control frame notifying unit 115 notifies the reconfigurable optical add/drop multiplexers 10a to 10n, which are at the upstream side and which have transmitted the signal light of each wavelength, of a control frame that is a frame used to notify various pieces of control information that includes the value of the optical power of each wavelength as the detection result that is obtained by the OCM 114. Specifically, the control frame notifying unit 115 notifies, via the communication line 15, such as a LAN, the optical power control unit 116 in the optical add module 11 that is included in each of the reconfigurable optical add/drop multiplexers 10a to 10n at the upstream side of the control frame. The control frame notifying unit 115 is an example of a notifying unit.

In the following, a description will be given of an example of a process for notifying the control frame notifying unit 115 of a control frame. When a notification is to be sent, first, the control frame notifying unit 115 acquires, from the firmware updating unit 117, update state information on firmware 118a that is used for the optical power control executed by the optical power control unit 116. The update state information on the firmware 118a mentioned here is information indicating whether the firmware 118a that is used for the optical power control is being updated. When update state information indicates that the firmware 118a is being updated, this indicates that the optical power control is being stopped, whereas, when update state information indicates that the firmware 118a is not being updated, this indicates that the optical power control is being executed. The update state information is an example of information that indicates the execution state of the optical power control. Then, the control frame notifying unit 115 acquires the value of the optical power of each wavelength from the detection result obtained from the OCM 114. Then, the control frame notifying unit 115 acquires, from an internal memory or the like in which information for identifying a device by wavelength is stored in advance, information for identifying a device according to the wavelength of light (hereinafter, referred to as "device-by-wavelength identification information") that is identification information on the reconfigurable optical add/drop multiplexers 10a to 10n, which are at the upstream side and which have transmitted signal light of each wavelength. Subsequently, the control frame notifying unit 115 creates a control frame in which the acquired update state information on the firmware 118a, the value of the optical power of each wavelength, and the device-by-wavelength identification information are included. Then, the control frame notifying unit 115 notifies the optical power control unit 116 in the optical add module 11 in each of the reconfigurable optical add/drop multiplexers 10a to 10n at the upstream side of the created control frame via the communication line 15, such as a LAN and the like.

Furthermore, when the firmware 118a is updated by the firmware updating unit 117, the control frame notifying unit 115 switches update state information on the firmware 118a included in the control frame to information indicating that the optical power control is being stopped. Then, the control frame notifying unit 115 notifies the reconfigurable optical add/drop multiplexers 10a to 10n at the upstream side of a control frame that includes therein the update state information that is obtained after the change.

Furthermore, when the firmware 118a has been updated by the firmware updating unit 117, the control frame notifying unit 115 switches the update state information on the firmware 118a included in the control frame to the information indicating that optical power control is being executed. Then, the control frame notifying unit 115 notifies the reconfigurable optical add/drop multiplexers 10a to 10n at the upstream side of the control frame that includes therein the update state information that is obtained after the change.

Figure 3:
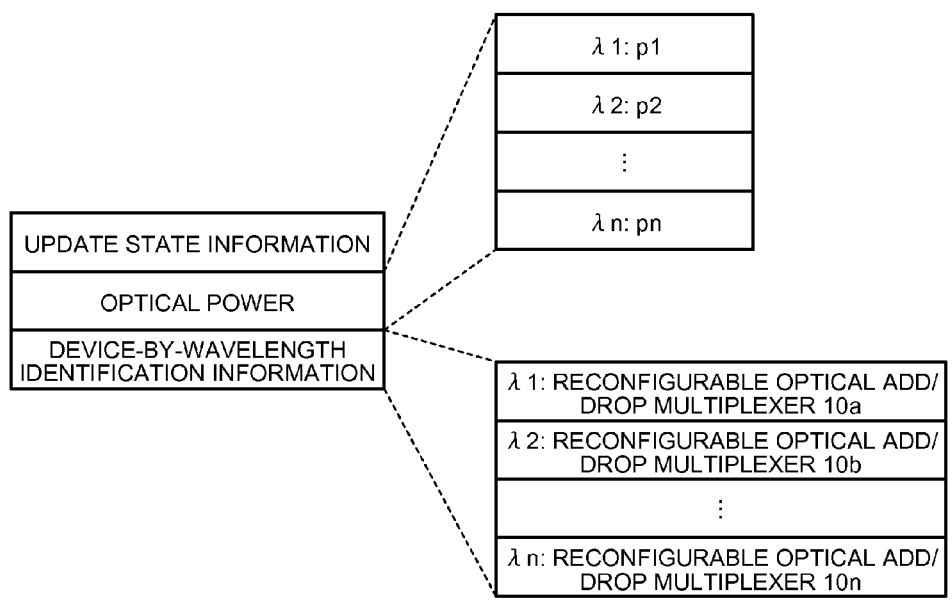
FIG. 3 is a schematic diagram illustrating an example of the data structure in a control frame according to the embodiment.

FIG. 3 is a schematic diagram illustrating an example of the data structure in a control frame according to the embodiment. As illustrated in FIG. 3, the control frame includes the update state information, the optical power, and the device-by-wavelength identification information. The "update state information" stores therein information indicating whether the firmware 118a, which is used by the optical power control unit 116 to execute the optical power control, is being updated. When the firmware 118a is being updated, i.e., when the optical power control is being stopped, "updating" indicating that the firmware 118a is being updated is stored. In contrast, when the firmware 118a is not being updated, i.e., when the optical power control is being executed, "not updating" indicating that the firmware 118a is not being updated is stored. The "optical power" stores therein a value of the optical power of each wavelength in the wavelength multiplexed light that is output from the reconfigurable optical add/drop multiplexer 10 at the downstream side. The "device-by-wavelength identification information" stores therein the identification information on the reconfigurable optical add/drop multiplexers 10a to 10n, which are at the upstream side and which have transmitted the signal light of each wavelength of the wavelength multiplexed light that is output from the reconfigurable optical add/drop multiplexer 10 at the downstream side. The control frame according to the embodiment includes therein, in an associated manner, the "device-by-wavelength identification information" and the "optical power".

For example, the "device-by-wavelength identification information" illustrated in FIG. 3 indicates that the signal light of the wavelengths "λ1" to "λn" in the wavelength multiplexed light that is output from the reconfigurable optical add/drop multiplexer 10 at the downstream side is transmitted from the "reconfigurable optical add/drop multiplexer 10a" to the "reconfigurable optical add/drop multiplexer 10n", respectively, at the upstream side. Furthermore, the "optical power" illustrated in FIG. 3 indicates that the optical power of the signal light of the wavelengths "λ1" to "λn" that have been transmitted from the "reconfigurable optical add/drop multiplexer 10*a*" to the "reconfigurable optical add/drop multiplexer 10*n*", respectively, at the upstream side are "p1" to "pn", respectively.

A description will be given here by referring back to FIG. 2. The optical power control unit 116 is a processing unit that executes the optical power control on the basis of the value of the optical power of each wavelength detected by the OCM 114 or the value of the optical power of each wavelength that is included in the control frame received from the reconfigurable optical add/drop multiplexer at the downstream side. The optical power control unit 116 is implemented by, for example, a central processing unit (CPU) or a field programmable gate array (FPGA) and executes the optical power control by executing the firmware 118*a* that is stored in the storing unit 118.

In the following, an example of the optical power control executed by the optical power control unit 116 will be described. When the optical power control unit 116 receives a control frame from the reconfigurable optical add/drop multiplexer at the downstream side via the communication line 15, such as a LAN, the optical power control unit 116 determines whether the update state information included in the control frame received from the reconfigurable optical add/drop multiplexer at the downstream side indicates "updating". When the update state information in the control frame received from the reconfigurable optical add/drop multiplexer at the downstream side indicates "not updating", it means the optical power control executed by the reconfigurable optical add/drop multiplexer at the downstream side is being executed. Consequently, the optical power control unit 116 performs the following process. Namely, the optical power control unit 116 discards the control frame and calculates the amount of attenuation in the WSS 112 on the basis of the optical power of each wavelength that is output as the detection result from the OCM 114. For example, the optical power control unit 116 calculates, as the amount of attenuation in the WSS 112, the difference value between the value of the optical power of each wavelength that is output from the OCM 114 as the detection result and the value of the targeted optical power.

In contrast, when the update state information in the control frame received from the reconfigurable optical add/drop multiplexer at the downstream side indicates "updating", it means the optical power control executed by the reconfigurable optical add/drop multiplexer at the downstream side is being stopped. Consequently, the optical power control unit 116 performs the following process. Namely, the optical power control unit 116 determines whether the device-by-wavelength identification information included in the control frame corresponds to the identification information on its own device. When the device-by-wavelength identification information corresponds to the identification information on its own device, the optical power control unit 116 acquires, from the control frame, the value of the optical power of each wavelength that is associated with the device-by-wavelength identification information. A description will be given, for example, with the assumption that the identification information on its own device is the "reconfigurable optical add/drop multiplexer 10*a*". In such a case, the optical power control unit 116 acquires, from the control frame illustrated in FIG. 3, "p1", which is the value of the optical power of the wavelength "λ1" that is associated with the device-by-wavelength identification information on the "reconfigurable optical add/drop multiplexer 10*a*" corresponding to the identification information on its own device. Furthermore, for example, a description will be given with the assumption that the identification information on its own device is the "reconfigurable optical add/drop multiplexer 10*b*". In such a case, the optical power control unit 116 acquires, from the control frame illustrated in FIG. 3, "p2", which is the value of the optical power of the wavelength "λ2" that is associated with the device-by-wavelength identification information on the "reconfigurable optical add/drop multiplexer 10*b*" corresponding to the identification information on its own device. Then, the optical power control unit 116 calculates the amount of attenuation in the WSS 112 on the basis of the value of the optical power of each wavelength acquired from the control frame. For example, the optical power control unit 116 calculates, as the amount of attenuation in the WSS 112, the difference value between the value of the optical power of each wavelength acquired from the control frame and the value of the targeted optical power. In contrast, when the device-by-wavelength identification information does not correspond to the identification information on its own device, the optical power control unit 116 calculates the amount of attenuation in the WSS 112 on the basis of the value of the optical power of each wavelength that is output from the OCM 114 as the detection result. For example, the optical power control unit 116 calculates, as the amount of attenuation in the WSS 112, the difference value between the value of the optical power of each wavelength that is output from the OCM 114 as the detection result and the value of the targeted optical power.

When the optical power control unit 116 calculates the amount of attenuation in the WSS 112, the optical power control unit 116 sets the attenuation in the WSS 112 to the calculated amount.

Furthermore, after the optical power control unit 116 receives a control frame in which update state information indicating "updating", which indicates that the optical power control is being stopped is included, if the optical power control unit 116 receives, from the device at the downstream side, a control frame in which update state information indicating "not updating", which indicates that the optical power control is being executed is included, the optical power control unit 116 performs the following process. Namely, the optical power control unit 116 calculates the amount of attenuation in the WSS 112 on the basis of the value of the optical power of each wavelength that is output from the OCM 114 as the detection result and sets the calculated amount of attenuation in the WSS 112, by predetermined amount, to the WSS 112, so that the optical power control unit 116 gradually adjusts the optical power of each wavelength.

Figure 4A:
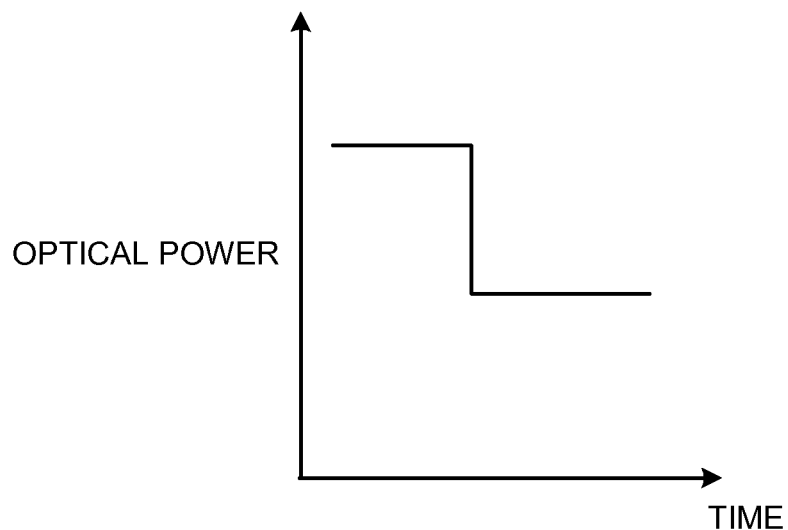
FIG. 4A is a schematic diagram illustrating an example of a process in which an optical power control unit according to the embodiment gradually adjusts optical power.
Figure 4B:
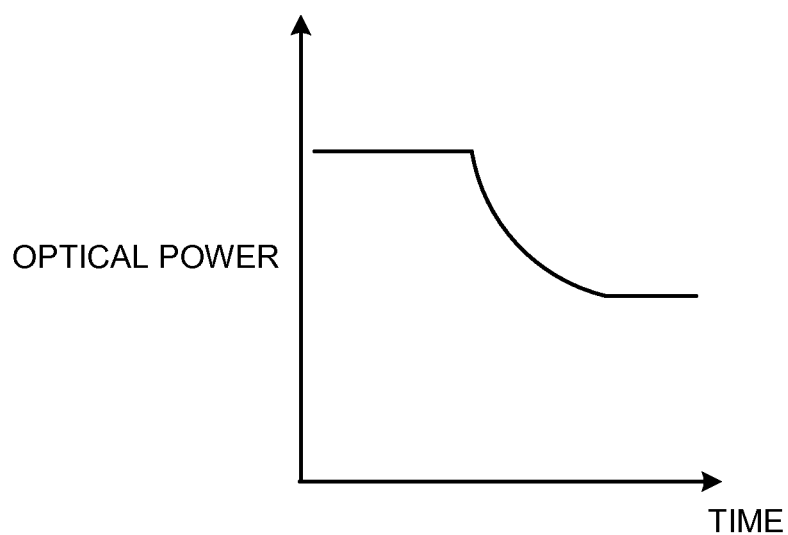
FIG. 4B is a schematic diagram illustrating an example of a process in which an optical power control unit according to the embodiment gradually adjusts optical power.

FIG. 4A and FIG. 4B are a schematic diagram illustrating an example of a process in which an optical power control unit according to the embodiment gradually adjusts the optical power. It is assumed that, after the optical power control unit 116 calculates the amount of attenuation in the WSS 112, the optical power control unit 116 sets the attenuation in the WSS 112 to all of the calculated amounts at the same time. In such a case, the optical power of a certain wavelength that is output from the WSS 112 suddenly varies with respect to the time axis illustrated in FIG. 4A. This sudden variation of the optical power may possibly trigger a communication failure. Accordingly, in order to avoid such a sudden variation of the optical power of each wavelength, after the optical power control unit 116 according to the embodiment calculates the amount of attenuation in the WSS 112, the optical power control unit 116 sets the calculated amount of attenuation in the WSS 112, by predetermined amount, to the WSS 112, so that the optical power control unit 116 gradually adjusts the optical power of each wavelength. Consequently, the optical power of a specific wavelength that is output from the WSS 112 gently varies as illustrated in FIG. 4B when compared with the example illustrated in FIG. 4A.

A description will be given here by referring back to FIG. 2. The firmware updating unit 117 downloads an updated file from an external device, such as a server or the like, and then updates the firmware 118a stored in the storing unit 118 by using the updated file that was downloaded.

Furthermore, the firmware updating unit 117 outputs, to the control frame notifying unit 115, update state information that indicates whether the firmware 118a is being updated. Furthermore, when the firmware updating unit 117 has updated the firmware 118a, the firmware updating unit 117 outputs an update completion notification to the control frame notifying unit 115.

The storing unit 118 is a storing unit that stores therein the firmware 118a that is used by the optical power control unit 116 to execute optical power control. The storing unit 118 is implemented by using, for example, a random access memory (RAM), a read only memory (ROM), a flash memory, a hard disk, an optical disk, or the like.

Figure 5A:
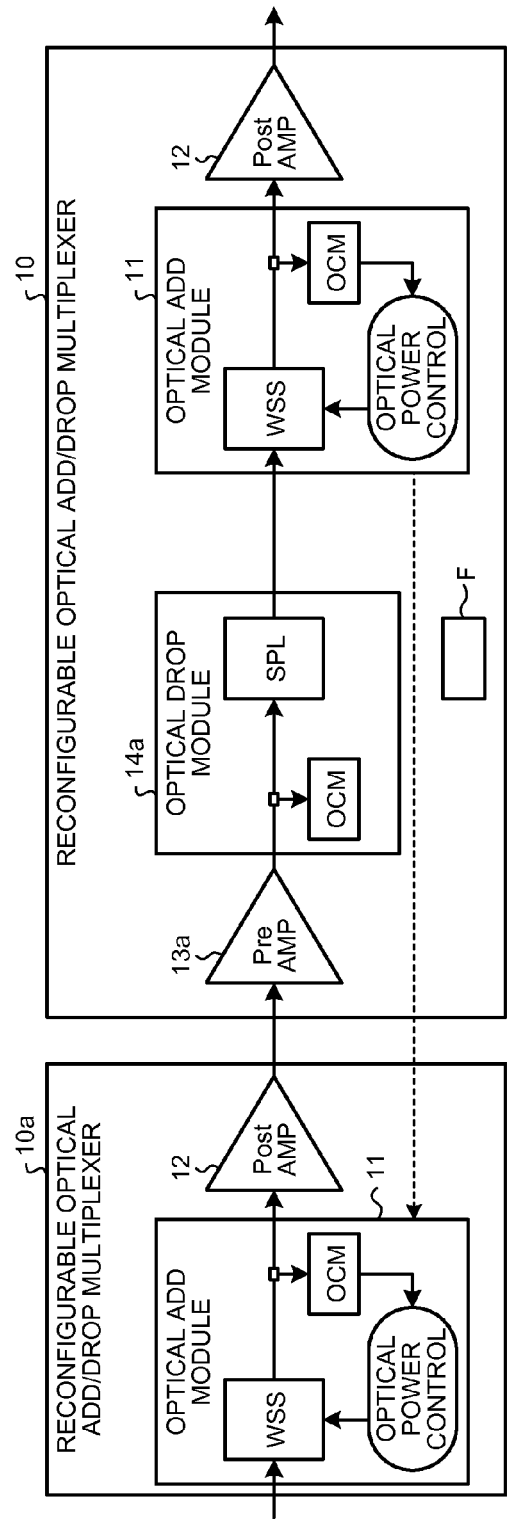
FIG. 5A is a schematic diagram illustrating operation example 1 in a case in which a reconfigurable optical add/drop multiplexer at the downstream side notifies a reconfigurable optical add/drop multiplexer at the upstream side of a control frame during normal operation.
Figure 5B:
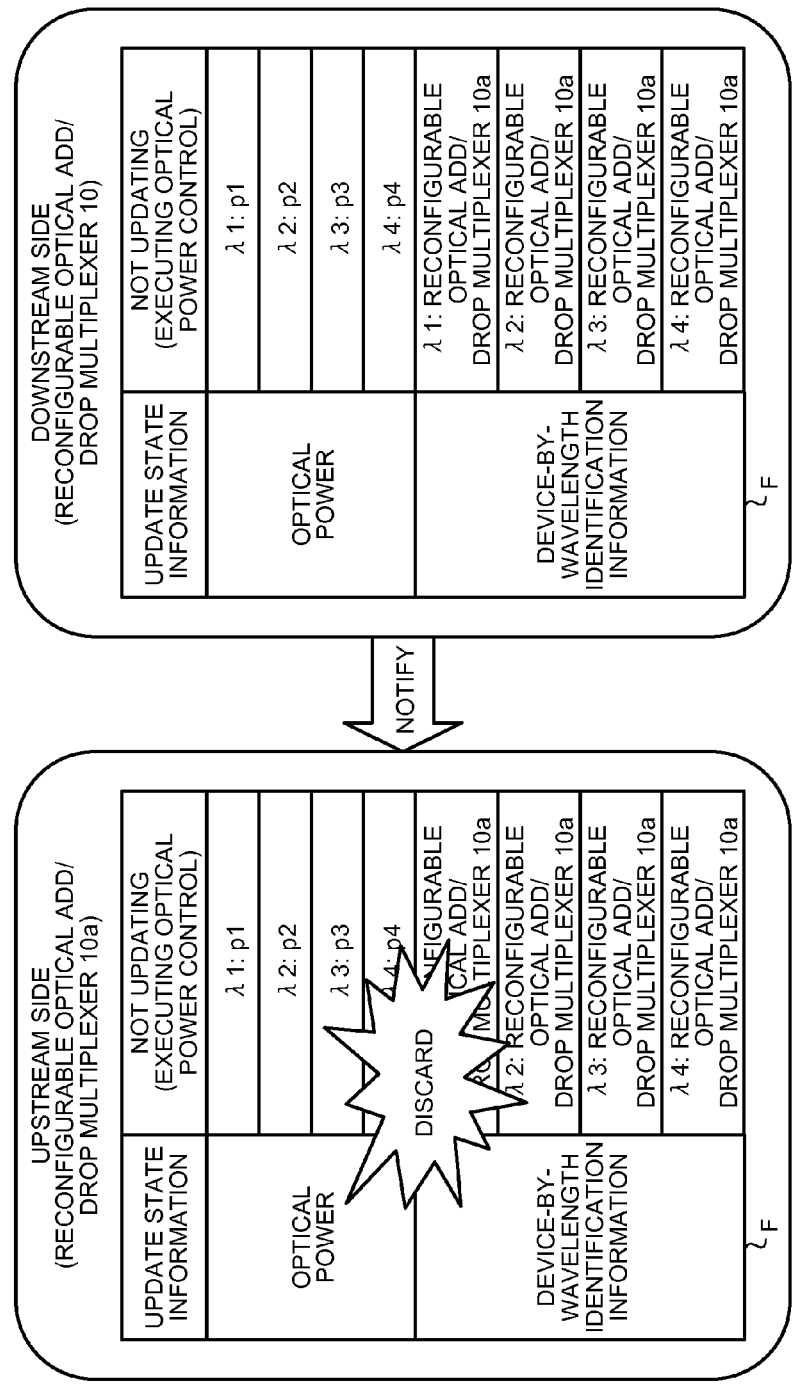
FIG. 5B is a schematic diagram illustrating the operation example 1 in a case in which the reconfigurable optical add/drop multiplexer at the downstream side notifies the reconfigurable optical add/drop multiplexer at the upstream side of the control frame during normal operation.

In the following, a description will be given of operation example 1 with reference to FIGS. 5A, 5B, 6A, and 6B in a case in which the reconfigurable optical add/drop multiplexer 10 at the downstream side notifies the reconfigurable optical add/drop multiplexer 10a at the upstream side of a control frame F. In FIGS. 5A, 5B, 6A, and 6B, a description will be given of an example in which the reconfigurable optical add/drop multiplexer 10a at the upstream side is connected to the reconfigurable optical add/drop multiplexer 10 at the downstream side via a transmission path, such as an optical fiber or the like. FIGS. 5A and 5B are schematic diagrams each illustrating operation example 1 in a case in which a reconfigurable optical add/drop multiplexer at the downstream side notifies a reconfigurable optical add/drop multiplexer at the upstream side of a control frame during normal operation. In this example, it is assumed that four pieces of signal light of the wavelengths "λ1" to "λ4" are multiplexed with respect to the wavelength multiplexed light that is targeted for transmission. Furthermore, it is assumed that the reconfigurable optical add/drop multiplexer 10a at the upstream side has transmitted all of the four pieces of signal light of the wavelengths "λ1" to "λ4" in the wavelength multiplexed light that is targeted for transmission.

As illustrated in FIG. 5A, during normal operation, the reconfigurable optical add/drop multiplexer 10 at the downstream side calculates the amount of attenuation in the WSS 112 on the basis of the value of the optical power of each wavelength that is output from the OCM 114 as the detection result and sets the attenuation in the WSS 112 to the calculated amount, so that the reconfigurable optical add/drop multiplexer 10 executes optical power control. Then, as illustrated in FIG. 5B, the reconfigurable optical add/drop multiplexer 10 at the downstream side sets "not updating", indicating that the firmware 118a is not being updated during normal operation, in the "update state information" in a control frame F in the control frame notifying unit 115 in the optical add module 11. The reconfigurable optical add/drop multiplexer 10 at the downstream side acquires the values "p1" to "p4" of the optical power of the wavelengths "λ1" to "λ4", respectively, from the detection result obtained by the OCM 114 and then sets each of the acquired values "p1" to "p4" of the optical power of each wavelength to the "optical power" in the control frame F. The reconfigurable optical add/drop multiplexer 10 at the downstream side acquires, from an internal memory or the like, the identification information on the reconfigurable optical add/drop multiplexer 10a at the upstream side that has transmitted the signal light of the wavelengths "λ1" to "λ4" and then sets the acquired identification information on the "reconfigurable optical add/drop multiplexer 10a" in the "device-by-wavelength identification information" in the control frame F. In this way, a control frame F is created in which the update state information on the firmware 118a, the value of the optical power of each wavelength, and the device-by-wavelength identification information are included.

Subsequently, as illustrated in FIG. 5A, the reconfigurable optical add/drop multiplexer 10 at the downstream side notifies the optical add module 11 in the reconfigurable optical add/drop multiplexer 10a at the upstream side via the communication line 15, such as a LAN or the like, of the control frame F that is created in the control frame notifying unit 115 in the optical add module 11.

The reconfigurable optical add/drop multiplexer 10a at the upstream side receives, by using the optical power control unit 116 in the optical add module 11, the control frame F sent from the reconfigurable optical add/drop multiplexer 10 at the downstream side via the communication line 15. Then, as illustrated in FIG. 5B, because the update state information in the control frame F indicates "not updating", the reconfigurable optical add/drop multiplexer 10a at the upstream side determines, by using the optical power control unit 116, that the optical power control in the reconfigurable optical add/drop multiplexer 10 at the downstream side is being executed and then performs the following process. Namely, the reconfigurable optical add/drop multiplexer 10a at the upstream side discards the control frame F and calculates the amount of attenuation in the WSS 112 on the basis of the value of the optical power of each wavelength that is output, as the detection result, from the OCM 114 in the reconfigurable optical add/drop multiplexer 10a at the upstream side. Subsequently, after calculating the amount of attenuation in the WSS 112, the reconfigurable optical add/drop multiplexer 10a at the upstream side sets the attenuation in the WSS 112 to the calculated amount.

Figure 6A:
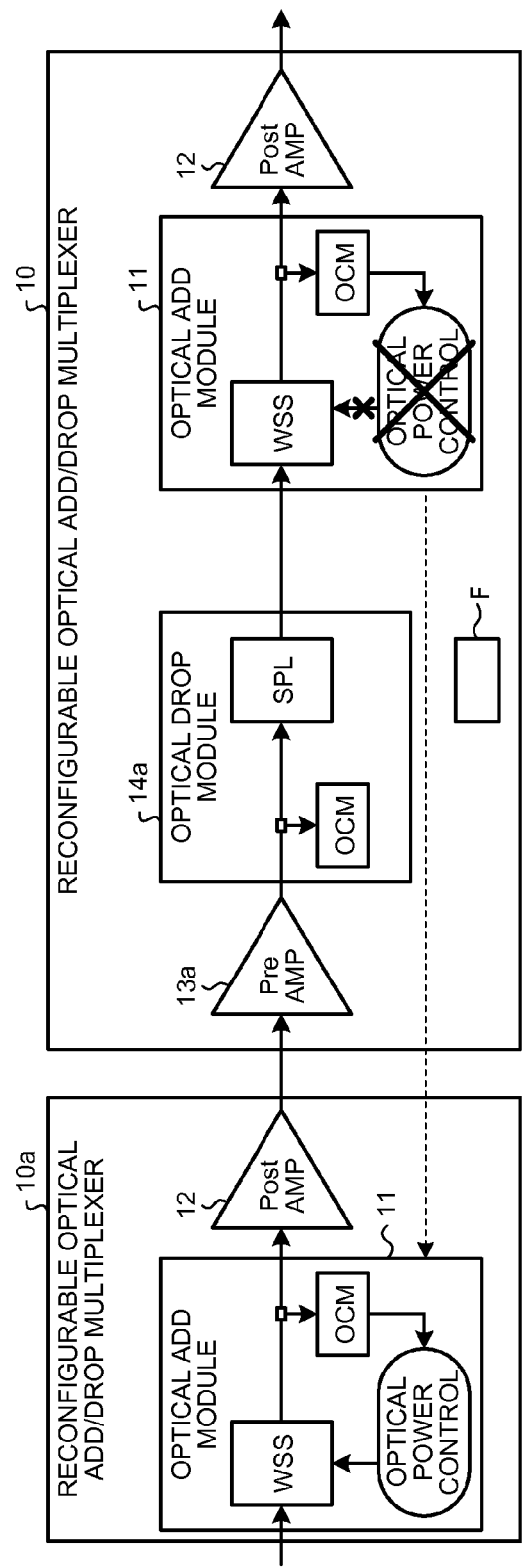
FIG. 6A is a schematic diagram illustrating the operation example 1 in a case in which the reconfigurable optical add/drop multiplexer at the downstream side notifies the reconfigurable optical add/drop multiplexer at the upstream side of the control frame when a firmware is being updated.
Figure 6B:
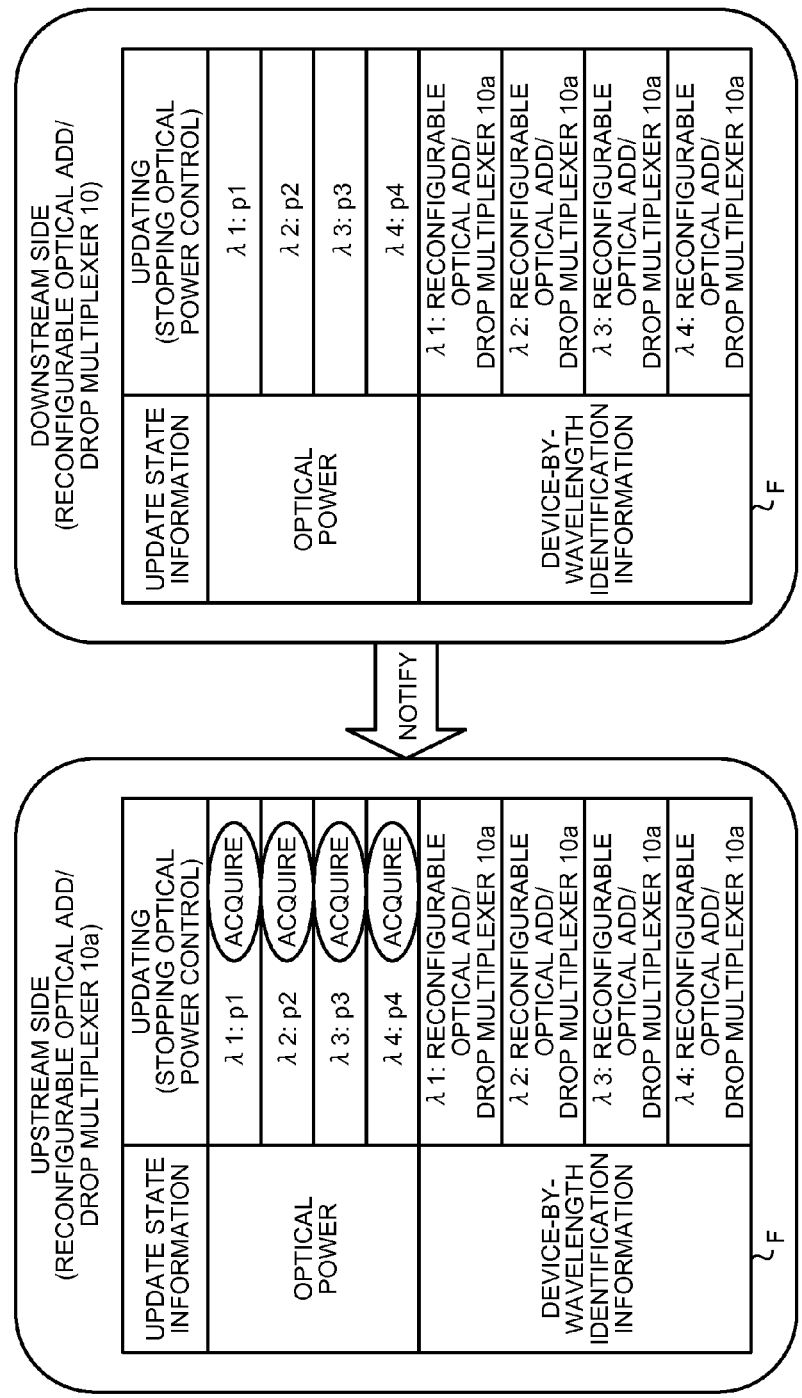
FIG. 6B is a schematic diagram illustrating the operation example 1 in a case in which the reconfigurable optical add/drop multiplexer at the downstream side notifies the reconfigurable optical add/drop multiplexer at the upstream side of the control frame when the firmware is being updated.

FIGS. 6A and 6B are schematic diagrams each illustrating the operation example 1 in a case in which the reconfigurable optical add/drop multiplexer at the downstream side notifies the reconfigurable optical add/drop multiplexer at the upstream side of the control frame when the firmware is being updated.

In the firmware updating unit 117 in the optical add module 11, the reconfigurable optical add/drop multiplexer 10 at the downstream side starts to update the firmware 118a stored in the storing unit 118. Then, as illustrated in FIG. 6A, the optical power control to be executed by the reconfigurable optical add/drop multiplexer 10 at the downstream side is stopped. Then, as illustrated in FIG. 6B, the reconfigurable optical add/drop multiplexer 10 at the downstream side switches the update state information in the control frame F from "not updating", which indicates that the optical power control is being executed, to "updating", which indicates that the optical power control is being stopped. Then, as illustrated in FIG. 6A, the reconfigurable optical add/drop multiplexer 10 at the downstream side notifies the optical add module 11 in the reconfigurable optical add/drop multiplexer 10a at the upstream side of the control frame F, which is in the control frame notifying unit 115 and in which "updating" that is obtained after the information has been switched is included as the update state information.

By using the optical power control unit 116 in the optical add module 11, the reconfigurable optical add/drop multiplexer 10a at the upstream side receives the control frame F sent from the reconfigurable optical add/drop multiplexer 10 at the downstream side via the communication line 15. Then, as illustrated in FIG. 6B, because the update state information in the control frame F indicates "updating", the reconfigurable optical add/drop multiplexer 10a at the upstream side determines, by using the optical power control unit 116, that the optical power control is being stopped in the reconfigurable optical add/drop multiplexer 10 at the downstream side and then performs the following process. Namely, the reconfigurable optical add/drop multiplexer 10a at the upstream side determines whether it is itself the device that is indicated by the device-by-wavelength identification information in the control frame F that corresponds to the identification information on the "reconfigurable optical add/drop multiplexer 10a". When the reconfigurable optical add/drop multiplexer 10a at the upstream side determines that it is itself the device that is indicated by the device-by-wavelength identification information on the "reconfigurable optical add/drop multiplexer 10a" in the control frame F, then the reconfigurable optical add/drop multiplexer 10a at the upstream side acquires, from the control frame F, the values "p1" to "p4" of the optical power of the wavelengths "λ1" to "λ4", respectively, that are associated with the device-by-wavelength identification information on the "reconfigurable optical add/drop multiplexer 10a". Then, the reconfigurable optical add/drop multiplexer 10a at the upstream side calculates the amount of attenuation in the WSS 112 on the basis of the values "p1" to "p4" of the optical power of the wavelengths "λ1" to "λ4", respectively, that are acquired from the control frame F.

Subsequently, when the reconfigurable optical add/drop multiplexer 10a at the upstream side calculates the amount of attenuation in the WSS 112, the reconfigurable optical add/drop multiplexer 10a sets the attenuation in the WSS 112 to this calculated amount.

Figure 7A:
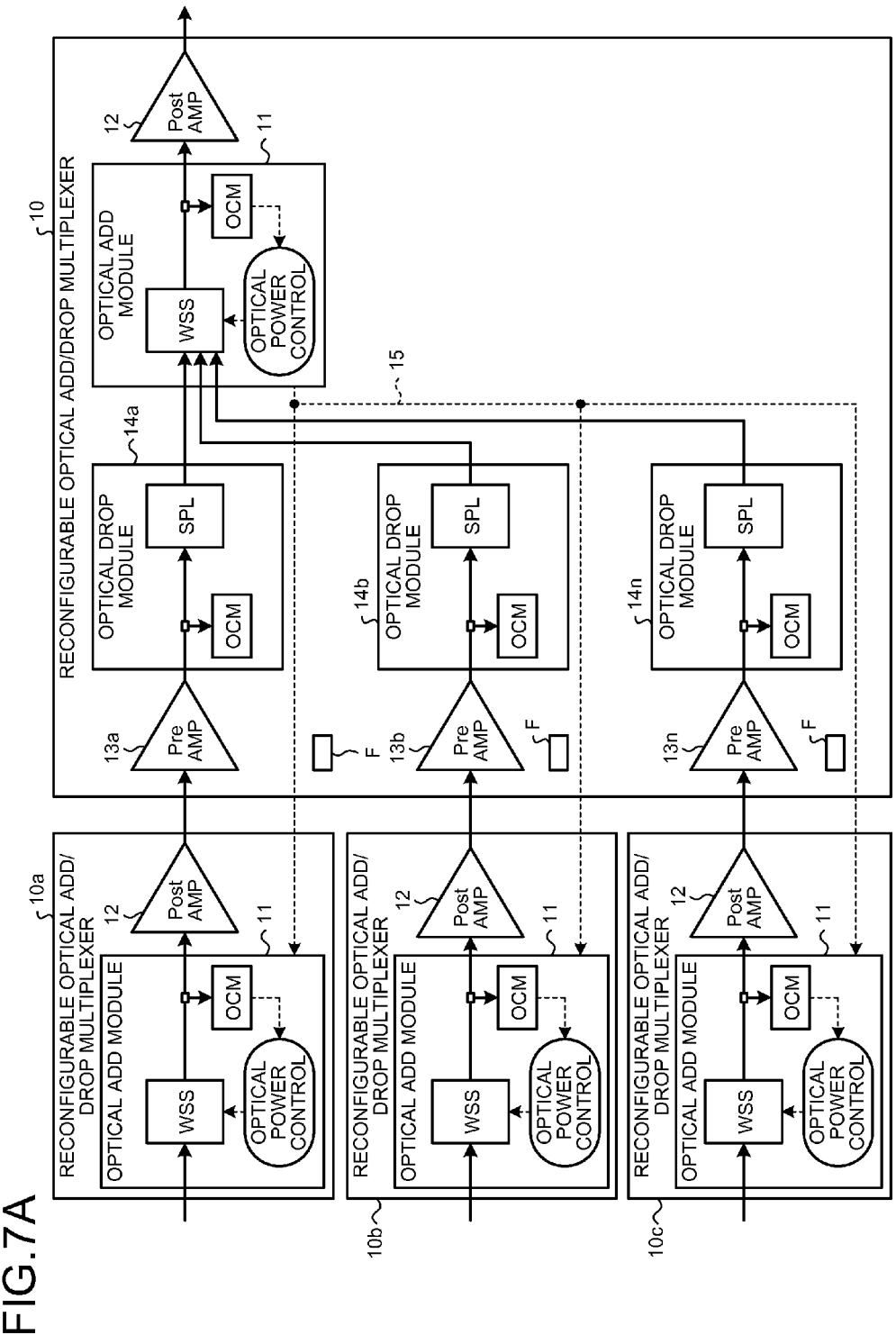
FIG. 7A is a schematic diagram illustrating operation example 2 in a case in which the reconfigurable optical add/drop multiplexer at the downstream side notifies the reconfigurable optical add/drop multiplexer at the upstream side of a control frame during normal operation.

In the following, a description will be given of operation example 2, with reference to FIGS. 7A, 7B, 8A, and 8B, in a case in which the reconfigurable optical add/drop multiplexer 10 at the downstream side notifies the reconfigurable optical add/drop multiplexers 10a to 10c at the upstream side of the control frame F. In FIGS. 7A, 7B, 8A, and 8B, a description will be given of an example in which the reconfigurable optical add/drop multiplexers 10a to 10c at the upstream side are connected to the reconfigurable optical add/drop multiplexer 10 at the downstream side via transmission paths, such as optical fibers or the like. FIGS. 7A and 7B are schematic diagrams each illustrating operation example 2 in a case in which the reconfigurable optical add/drop multiplexer at the downstream side notifies the reconfigurable optical add/drop multiplexers at the upstream side of a control frame during normal operation. In this example, it is assumed that four pieces of signal light of the wavelengths "λ1" to "λ4" are multiplexed with respect to the wavelength multiplexed light that is targeted for transmission. Furthermore, it is assumed that the reconfigurable optical add/drop multiplexer 10a at the upstream side transmits, from among four pieces of signal light in the wavelength multiplexed light that is targeted for transmission, the signal light of the wavelength "λ1" and the signal light of the "λ4". Furthermore, it is assumed that the reconfigurable optical add/drop multiplexer 10b at the upstream side transmits, from among four pieces of signal light in the wavelength multiplexed light that is targeted for transmission, the signal light of the wavelength "λ2". Furthermore, it is assumed that the reconfigurable optical add/drop multiplexer 10c at the upstream side transmits, from among four pieces of signal light in the wavelength multiplexed light that is targeted for transmission, the signal light of the wavelength "λ3".

As illustrated in FIG. 7A, during normal operation, the reconfigurable optical add/drop multiplexer 10 at the downstream side calculates the amount of attenuation in the WSS 112 on the basis of the value of the optical power of each wavelength that is output from the OCM 114 as the detection result and sets the attenuation in the WSS 112 to this calculated amount, so that the reconfigurable optical add/drop multiplexer 10 executes optical power control. Then, as illustrated in FIG. 7B, the reconfigurable optical add/drop multiplexer 10 at the downstream side sets the "update state information" in the control frame F in the control frame notifying unit 115 in the optical add module 11 to "not updating", indicating that the firmware 118a is not being updated during normal operation. The reconfigurable optical add/drop multiplexer 10 at the downstream side acquires the values "p1" to "p4" of the optical power of the wavelengths "λ1" to "λ4", respectively, from the detection result obtained by the OCM 114 and then sets each of the acquired values "p1" to "p4" of the optical power of each wavelength to the "optical power" in the control frame F. The reconfigurable optical add/drop multiplexer 10 at the downstream side acquires, from an internal memory or the like, the identification information on the reconfigurable optical add/drop multiplexer 10a at the upstream side that has transmitted the signal light of the wavelength "λ1" and the signal light of the wavelength "λ2" and then sets the acquired identification information on the "reconfigurable optical add/drop multiplexer 10a" to the "device-by-wavelength identification information" in the control frame F. The reconfigurable optical add/drop multiplexer 10 at the downstream side acquires, from an internal memory or the like, the identification information on the reconfigurable optical add/drop multiplexer 10b at the upstream side that has transmitted the signal light of the wavelength "λ2" and then sets the acquired identification information on the "reconfigurable optical add/drop multiplexer 10b" to the "device-by-wavelength identification information" in the control frame F. The reconfigurable optical add/drop multiplexer 10 at the downstream side acquires, from an internal memory or the like, the identification information on the reconfigurable optical add/drop multiplexer 10c at the upstream side that has transmitted the signal light of the wavelength "λ3" and then sets the acquired identification information on the "reconfigurable optical add/drop multiplexer 10c" to the "device-by-wavelength identification information" in the control frame F. In this way, a control frame F is created, in which the update state information on the firmware 118a, the value of the optical power of each wavelength, and the device-by-wavelength identification information are included.

Subsequently, as illustrated in FIG. 7A, by using the control frame notifying unit 115 in the optical add module 11, the reconfigurable optical add/drop multiplexer 10 at the downstream side notifies the optical add module 11 included in each of the reconfigurable optical add/drop multiplexers 10a to 10c at the upstream side of the control frame F via the communication line 15, such as a LAN.

The reconfigurable optical add/drop multiplexers 10a to 10c at the upstream side receives, by using the optical power control unit 116 in the optical add module 11, the control frame F sent from the reconfigurable optical add/drop multiplexer 10 at the downstream via the communication line 15. Then, as illustrated in FIG. 7B, because the update state information in the control frame F indicates "not updating", the reconfigurable optical add/drop multiplexers 10a to 10c at the upstream side determine, by using the optical power control unit 116, that optical power control in the reconfigurable optical add/drop multiplexer 10 at the downstream side is being executed and then perform the following process. Namely, the reconfigurable optical add/drop multiplexers 10a to 10c at the upstream side discard the control frame F and calculate the amount of attenuation in the WSS 112 on the basis of the optical power of each wavelength that is output, as the detection result, from the OCM 114 in each of the reconfigurable optical add/drop multiplexers 10a to 10c at the upstream side. Subsequently, after calculating the amount of attenuation in the WSS 112, the reconfigurable optical add/drop multiplexers 10a to 10c at the upstream side set the attenuation in the WSS 112 to the calculated amount.

Figure 8B:
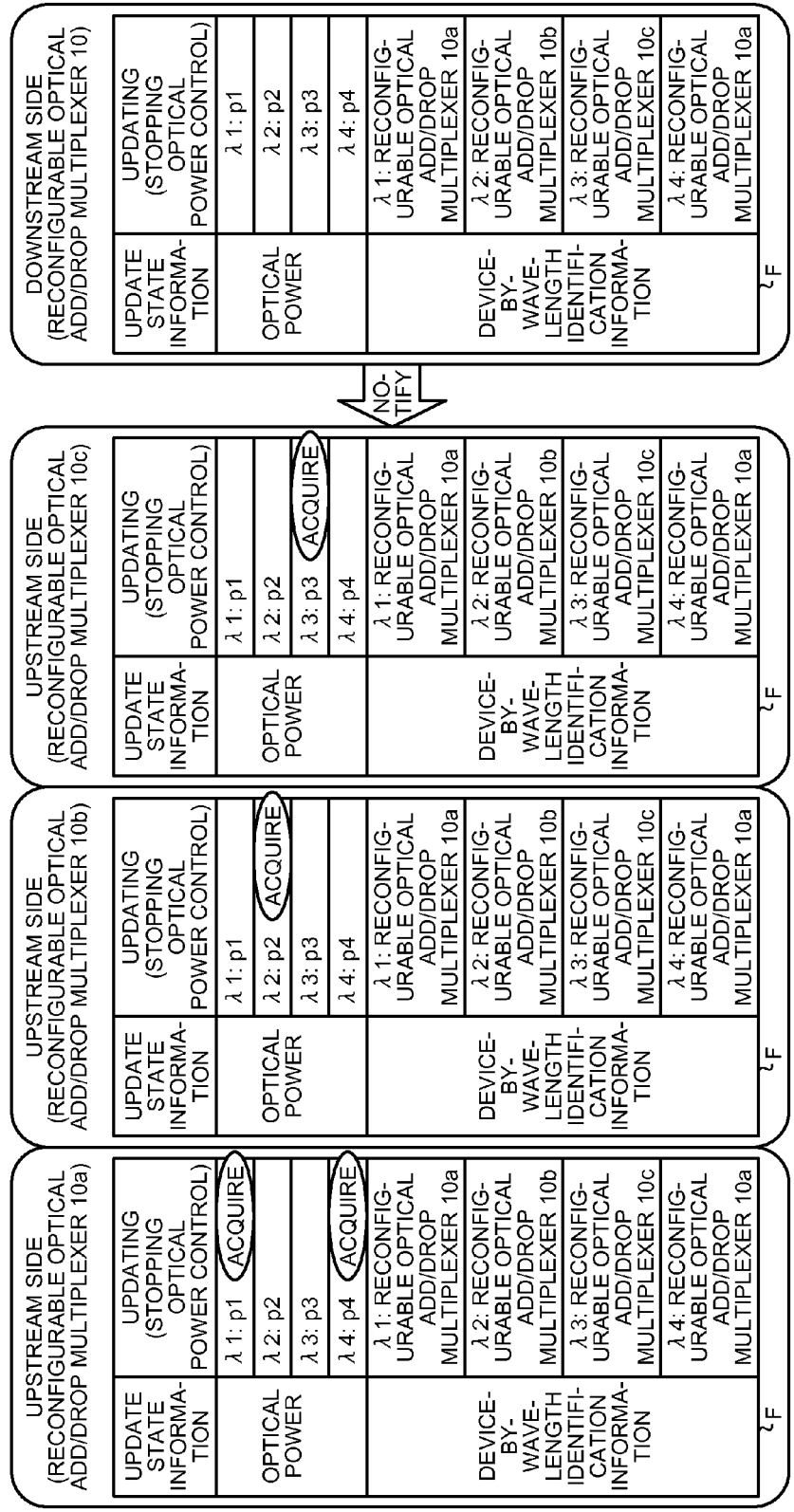
FIG. 8B is a schematic diagram illustrating the operation example 2 in a case in which the reconfigurable optical add/drop multiplexer at the downstream side notifies the reconfigurable optical add/drop multiplexer at the upstream side of the control frame when the firmware is being updated.

FIGS. 8A and 8B are schematic diagrams each illustrating the operation example 2 in a case in which the reconfigurable optical add/drop multiplexer at the downstream side notifies the reconfigurable optical add/drop multiplexers at the upstream side of the control frame when the firmware is being updated.

In the firmware updating unit 117 in the optical add module 11, the reconfigurable optical add/drop multiplexer 10 at the downstream side starts to update the firmware 118a stored in the storing unit 118. Then, as illustrated in FIG. 8A, the optical power control to be executed by the reconfigurable optical add/drop multiplexer 10 at the downstream side is stopped. Then, as illustrated in FIG. 8B, the reconfigurable optical add/drop multiplexer 10 at the downstream side switches the update state information in the control frame F to "updating", indicating that the optical power control is being stopped. Then, as illustrated in FIG. 8A, the reconfigurable optical add/drop multiplexer 10 at the downstream side notifies the optical add module 11 in each of the reconfigurable optical add/drop multiplexers 10a to 10c at the upstream side of the control frame F, which is in the control frame notifying unit 115 and in which "updating" that is obtained after the information has been switched is included as the update state information.

By using the optical power control unit 116 in the optical add module 11, the reconfigurable optical add/drop multiplexer 10a at the upstream side receives the control frame F sent from the reconfigurable optical add/drop multiplexer 10 at the downstream side via the communication line 15. Then, as illustrated in FIG. 8B, because the update state information in the control frame F indicates "updating", the reconfigurable optical add/drop multiplexer 10a at the upstream side determines, by using the optical power control unit 116, that the optical power control is being stopped in the reconfigurable optical add/drop multiplexer 10 at the downstream side and then performs the following process. Namely, the reconfigurable optical add/drop multiplexer 10a at the upstream side determines whether it is itself the device that is indicated by the device-by-wavelength identification information in the control frame F that corresponds to the identification information on the "reconfigurable optical add/drop multiplexer 10a". After the determination, when the reconfigurable optical add/drop multiplexer 10a at the upstream side determines that it is itself the device that is indicated by the device-by-wavelength identification information on the "reconfigurable optical add/drop multiplexer 10a" in the control frame F, then the reconfigurable optical add/drop multiplexer 10a at the upstream side acquires, from the control frame F, the value "p1" of the optical power of the wavelength "λ1" and the value "p4" of the optical power of the wavelength "λ4", which are associated with the device-by-wavelength identification information on the "reconfigurable optical add/drop multiplexer 10a". Then, the reconfigurable optical add/drop multiplexer 10a at the upstream side calculates the amount of attenuation in the WSS 112 on the basis of the value "p1" of the optical power of the wavelength "λ1" and the value "p2" of the optical power of the wavelength "λ4" that are acquired from the control frame F.

In contrast, after the determination, when the reconfigurable optical add/drop multiplexer 10a at the upstream side determines that it is not itself the device that is indicated by the device-by-wavelength identification information on the "reconfigurable optical add/drop multiplexer 10b" and the "reconfigurable optical add/drop multiplexer 10c" included in the control frame F, then the reconfigurable optical add/drop multiplexer 10a at the upstream side acquires, from the detection result performed by the OCM 114, the value of the optical power of the wavelength "λ2", which is associated with the device-by-wavelength identification information on the "reconfigurable optical add/drop multiplexer 10b", and the value of the optical power of the wavelength "λ3", which is associated with the device-by-wavelength identification information on the "reconfigurable optical add/drop multiplexer 10c". Then, the reconfigurable optical add/drop multiplexer 10a at the upstream side calculates the amount of attenuation in the WSS 112 on the basis of the value of the optical power of the wavelength "λ2" and the value of the optical power of the wavelength "λ3" that are acquired from the detection result performed by the OCM 114.

Subsequently, when the reconfigurable optical add/drop multiplexer 10a at the upstream side calculates the amount of attenuation in the WSS 112, the reconfigurable optical add/drop multiplexer 10a sets the attenuation in the WSS 112 to the calculated amount.

By using the optical power control unit 116 in the optical add module 11, the reconfigurable optical add/drop multiplexer 10b at the upstream side receives the control frame F that is sent from the reconfigurable optical add/drop multiplexer 10 at the downstream side via the communication line 15. Then, as illustrated in FIG. 8B, because the update state information in the control frame F indicates "updating", the reconfigurable optical add/drop multiplexer 10b at the upstream side determines, by using the optical power control unit 116, that the optical power control is being stopped in the reconfigurable optical add/drop multiplexer 10 at the downstream side and then performs the following process. Namely, the reconfigurable optical add/drop multiplexer 10b at the upstream side determines whether it is itself the device that is indicated by the device-by-wavelength identification information in the control frame F that corresponds to the identification information on the "reconfigurable optical add/drop multiplexer 10b". After the determination, when the reconfigurable optical add/drop multiplexer 10b at the upstream side determines that it is itself the device that is indicated by the device-by-wavelength identification information on the "reconfigurable optical add/drop multiplexer 10b" in the control frame F, then the reconfigurable optical add/drop multiplexer 10b at the upstream side acquires, from the control frame F, the value "p2" of the optical power of the wavelength "λ2" that is associated with the device-by-wavelength identification information on the "reconfigurable optical add/drop multiplexer 10b". Then, the reconfigurable optical add/drop multiplexer 10b at the upstream side calculates the amount of attenuation in the WSS 112 on the basis of the value "p2" of the optical power of the wavelength "λ2" that is acquired from the control frame F.

In contrast, after the determination, when the reconfigurable optical add/drop multiplexer 10b at the upstream side determines that it is not itself the device that is indicated by the device-by-wavelength identification information on the "reconfigurable optical add/drop multiplexer 10a" and the "reconfigurable optical add/drop multiplexer 10c" in the control frame F, then the reconfigurable optical add/drop multiplexer 10b at the upstream side acquires, from the detection result performed by the OCM 114, the values of the optical power of the wavelengths "λ1" and "λ4", which are associated with the device-by-wavelength identification information on the "reconfigurable optical add/drop multiplexer 10a", and the value of the optical power of the wavelength "λ3", which is associated with the device-by-wavelength identification information on the "reconfigurable optical add/drop multiplexer 10c". Then, the reconfigurable optical add/drop multiplexer 10b at the upstream side calculates the amount of attenuation in the WSS 112 on the basis of the value of the optical power of the wavelength "λ1", the value of the optical power of the wavelength "λ3", and the value of the optical power of the wavelength "λ4", which are acquired from the detection result performed by the OCM 114.

Subsequently, after calculating the amount of attenuation in the WSS 112, the reconfigurable optical add/drop multiplexer 10b at the upstream side sets the attenuation in the WSS 112 to the calculated amount.

By using the optical power control unit 116 in the optical add module 11, the reconfigurable optical add/drop multiplexer 10c at the upstream side receives the control frame F sent from the reconfigurable optical add/drop multiplexer 10 at the downstream side via the communication line 15. Then, as illustrated in FIG. 8B, because the update state information in the control frame F indicates "updating", the reconfigurable optical add/drop multiplexer 10c at the upstream side determines, by using the optical power control unit 116, that the optical power control is being stopped in the reconfigurable optical add/drop multiplexer 10 at the downstream side and then performs the following process. Namely, the reconfigurable optical add/drop multiplexer 10c at the upstream side determines whether it is itself the device that is indicated by the device-by-wavelength identification information in the control frame F that corresponds to the identification information on the "reconfigurable optical add/drop multiplexer 10c". After the determination, the reconfigurable optical add/drop multiplexer 10c at the upstream side determines that it is itself the device that is indicated by the device-by-wavelength identification information on the "reconfigurable optical add/drop multiplexer 10c" in the control frame F, then the reconfigurable optical add/drop multiplexer 10c at the upstream side acquires, from the control frame F, the value "p3" of the optical power of the wavelength "λ3" that is associated with the device-by-wavelength identification information on the "reconfigurable optical add/drop multiplexer 10c". Then, the reconfigurable optical add/drop multiplexer 10c at the upstream side calculates the amount of attenuation in the WSS 112 on the basis of the value "p3" of the optical power of the wavelength "λ3" that is acquired from the control frame F.

In contrast, after the determination, when the reconfigurable optical add/drop multiplexer 10c at the upstream side determines that it is not itself the device that is indicated by the device-by-wavelength identification information on the "reconfigurable optical add/drop multiplexer 10a" and the "reconfigurable optical add/drop multiplexer 10b" in the control frame F, then the reconfigurable optical add/drop multiplexer 10c at the upstream side acquires, from the detection result performed by the OCM 114, the values of the optical power of the wavelengths "λ1" and "λ4", which are associated with the device-by-wavelength identification information on the "reconfigurable optical add/drop multiplexer 10a", and the value of the optical power of the wavelength "λ2", which is associated with the device-by-wavelength identification information on the "reconfigurable optical add/drop multiplexer 10b". Then, the reconfigurable optical add/drop multiplexer 10c at the upstream side calculates the amount of attenuation in the WSS 112 on the basis of the value of the optical power of the wavelength "λ1", the value of the optical power of the wavelength "λ2", and the value of the optical power of the wavelength "λ4", which are acquired from the detection result performed by the OCM 114.

Subsequently, after calculating the amount of attenuation in the WSS 112, the reconfigurable optical add/drop multiplexer 10c at the upstream side sets the attenuation in the WSS 112 to the calculated amount.

Figure 9:
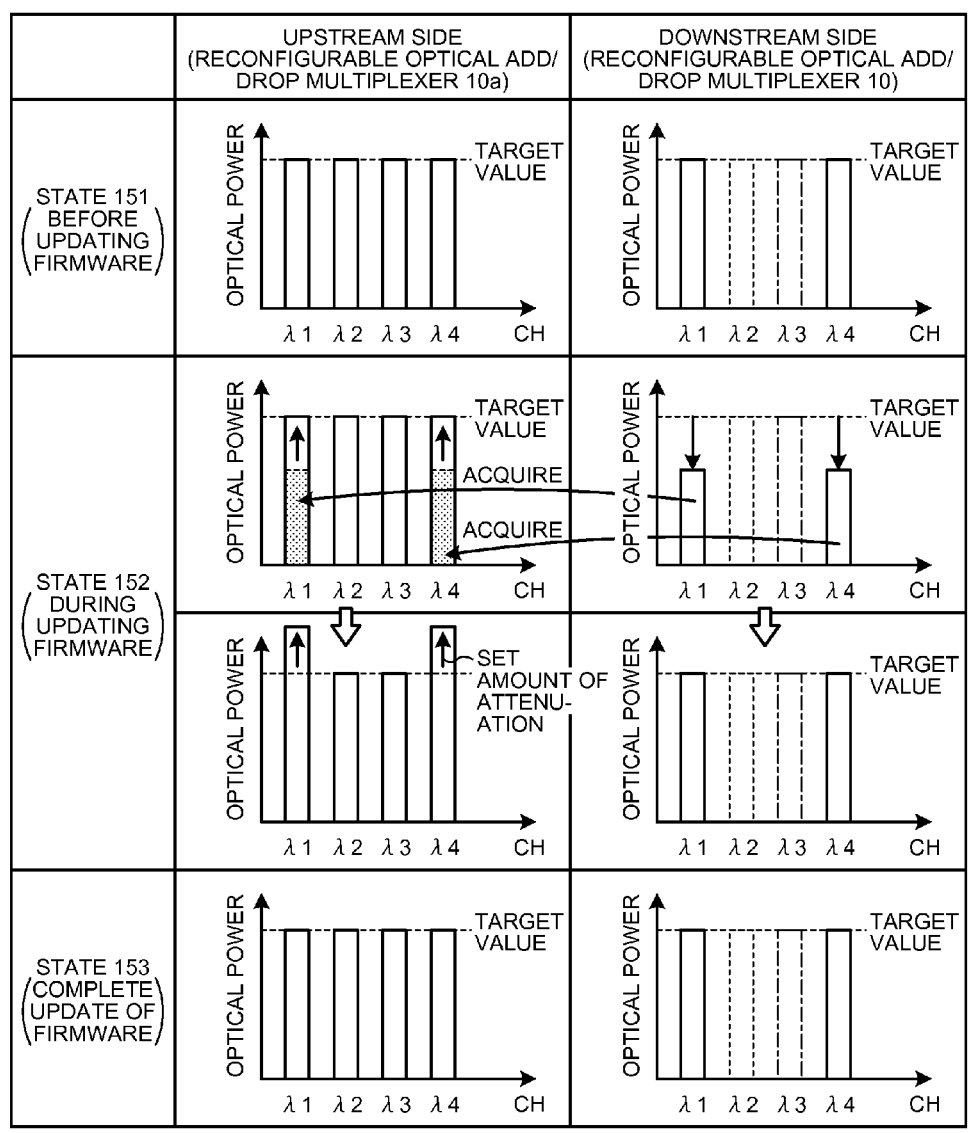
FIG. 9 is a schematic diagram illustrating the transition state of the optical power of light output from the reconfigurable optical add/drop multiplexer at the downstream side when the reconfigurable optical add/drop multiplexer at the downstream side notifies the reconfigurable optical add/drop multiplexer at the upstream side of the control frame when the firmware is being updated.

In the following, a description will be given, with reference to FIG. 9, of the transition state of the optical power of light that is output from the reconfigurable optical add/drop multiplexer 10 at the downstream side when the reconfigurable optical add/drop multiplexer 10 at the downstream side notifies the reconfigurable optical add/drop multiplexer 10a at the upstream side of the control frame when the firmware is being updated. FIG. 9 is a schematic diagram illustrating the transition state of the optical power of light output from the reconfigurable optical add/drop multiplexer at the downstream side when the reconfigurable optical add/drop multiplexer at the downstream side notifies the reconfigurable optical add/drop multiplexer at the upstream side of the control frame when the firmware is being updated. The example illustrated in FIG. 9 is associated with the operation example 2 illustrated in FIGS. 7A, 7B, 8A, and 8B.

Before updating the firmware 118a, the reconfigurable optical add/drop multiplexer 10 at the downstream side executes the optical power control that controls the adjustment level in the WSS 112. Consequently, the values of the optical power of the wavelengths in the wavelength multiplexed light that are output from the reconfigurable optical add/drop multiplexer 10 at the downstream side are uniform, i.e., are the same value as that of the targeted optical power, as illustrated by a state 151.

The reconfigurable optical add/drop multiplexer 10a at the upstream side executes the optical power control that controls the adjustment level in the WSS 112. Consequently, the values of the optical power of the wavelengths in the wavelength multiplexed light that are output from the reconfigurable optical add/drop multiplexer 10a at the upstream side are uniform, i.e., are the same value as that of the targeted optical power, as illustrated by the state 151.

Then, the reconfigurable optical add/drop multiplexer 10 at the downstream side starts to update the firmware 118a. Specifically, the optical power control in the reconfigurable optical add/drop multiplexer 10 at the downstream side is stopped during the updating of the firmware 118a. In this state, it is assumed that a failure has occurred in a transmission path, such as an optical fiber or the like, that connects the reconfigurable optical add/drop multiplexer 10 at the downstream side and the reconfigurable optical add/drop multiplexer 10a at the upstream side.

In such a case, as illustrated in the upper portion of a state 152, the optical power of the signal light of the wavelength "λ1" and the optical power of the signal light of the wavelength "λ4" sent from the reconfigurable optical add/drop multiplexer 10a at the upstream side drop. Then, the value "p1" of the optical power of the wavelength "λ1" and the value "p4" of the optical power of the wavelength "λ4" in the control frame F that was sent, as a notification, from the reconfigurable optical add/drop multiplexer 10 at the downstream side to the reconfigurable optical add/drop multiplexer 10a at the upstream side drop.

As illustrated in the upper portion of the state 152, the reconfigurable optical add/drop multiplexer 10a at the upstream side acquires, from the control frame F, both the value "p1" of the dropped optical power of the wavelength "λ1" and the value "p4" of the dropped optical power of the wavelength "λ4". Then, the reconfigurable optical add/drop multiplexer 10a at the upstream side calculates the amount of attenuation in the WSS 112 on the basis of both the value of the "p1" of the dropped optical power of the wavelength "λ1" and the value "p4" of the dropped optical power of the wavelength "λ4". In this example, the reconfigurable optical add/drop multiplexer 10a at the upstream side calculates, as the amount of attenuation in the WSS 112, the difference value between the value "p1" of the dropped optical power of the wavelength "λ1" and the targeted value and the difference value between the value "p4" of the dropped optical power of the wavelength "λ4" and the targeted value. Subsequently, as illustrated in the lower portion of the state 152, after calculating the amount of attenuation in the WSS 112, the reconfigurable optical add/drop multiplexer 10a at the upstream side sets the attenuation in the WSS 112 to the calculated amount.

Then, the value "p1" of the optical power of the wavelength "λ1" and the value "p4" of the optical power of the wavelength "λ4" in the wavelength multiplexed light that is output from the reconfigurable optical add/drop multiplexer 10 at the downstream side become uniform again, i.e., become the same value as that of the targeted optical power, as illustrated in the lower portion of the state 152. Consequently, even when the control of the WSS 112 in the reconfigurable optical add/drop multiplexer 10 at the downstream side is stopped, the value of the optical power of each wavelength in the wavelength multiplexed light is maintained at the target value, which makes it possible to maintain the stability of communication.

After having updated the firmware 118a, the reconfigurable optical add/drop multiplexer 10 at the downstream side switches the update state information in the control frame F to "not updating", which indicates the optical power control is not being executed. Then, the reconfigurable optical add/drop multiplexer 10 at the downstream side notifies the reconfigurable optical add/drop multiplexer 10a at the upstream side of the control frame F that includes update state information "not updating" that is obtained after the switching. The reconfigurable optical add/drop multiplexer 10a at the upstream side that has received the control frame F that includes the update state information "not updating" calculates the amount of attenuation in the WSS 112 on the basis of the value of the optical power of the wavelength "λ1" and the value of the optical power of the wavelength "λ4" that are output from the OCM 114 as the detection result. Then, the reconfigurable optical add/drop multiplexer 10a at the upstream side gradually adjusts both the value of the optical power of the wavelength "λ1" and the value of the optical power of the wavelength "λ4" by setting, for each predetermined wavelength, the attenuation in the WSS 112 to the calculated amount. Consequently, the value of the optical power of the wavelength "λ1" and the value of the optical power of the wavelength "λ4" that are output from the reconfigurable optical add/drop multiplexer 10a at the upstream side are made uniform again, i.e., become the same value as that of the targeted optical power, as illustrated by a state 153.

Figure 10:
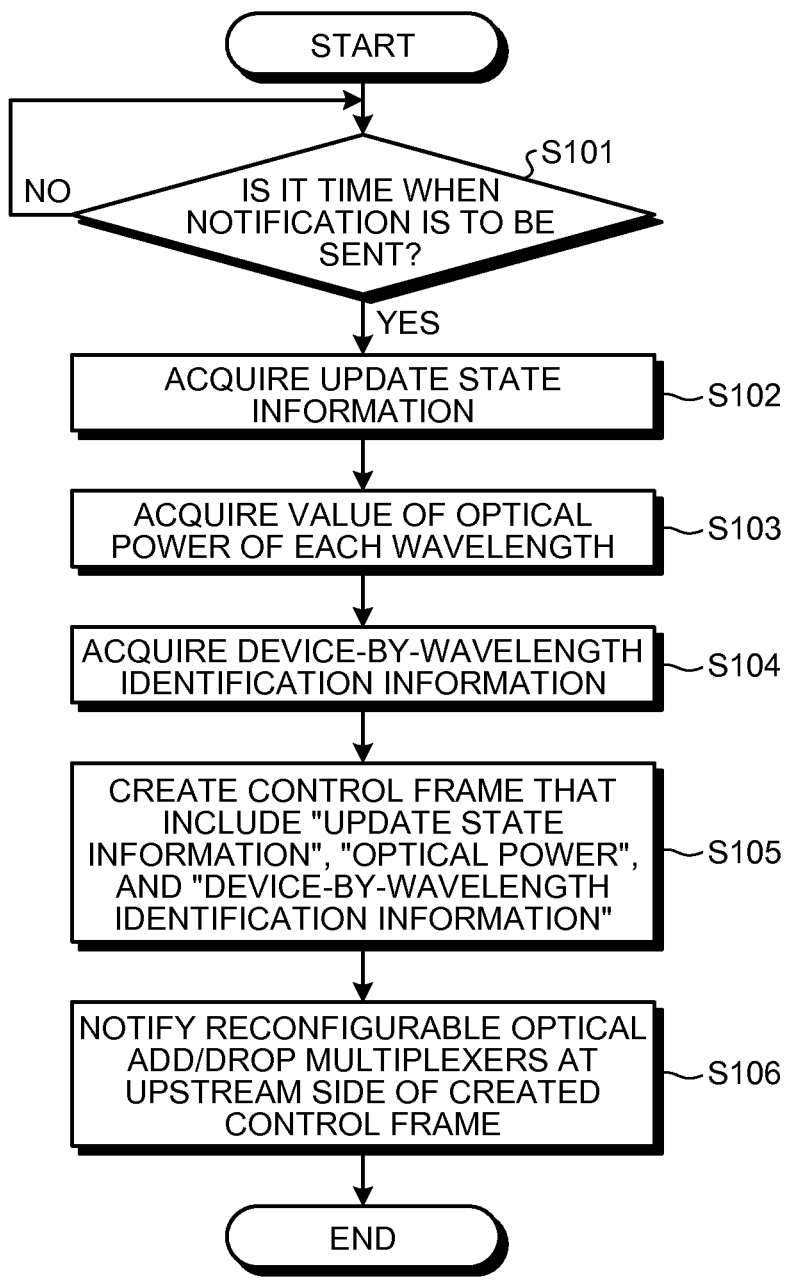
FIG. 10 is a flowchart illustrating the flow of a control frame notifying process performed by the optical add module according to the embodiment.

In the following, a description will be given of a process performed by the optical add module 11 illustrated in FIG. 2. FIG. 10 is a flowchart illustrating the flow of a control frame notifying process performed by the optical add module according to the embodiment. The control frame notifying process illustrated in FIG. 10 is a process for, for example, sending a control frame as a notification from the reconfigurable optical add/drop multiplexer 10 at the downstream side to the reconfigurable optical add/drop multiplexers 10a to 10n at the upstream side.

As illustrated in FIG. 10, the control frame notifying unit 115 in the optical add module 11 in the reconfigurable optical add/drop multiplexer 10 at the downstream side waits until a notification is to be sent (No at Step S101).

When a notification is to be sent (Yes at Step S101), the control frame notifying unit 115 acquires, from the firmware updating unit 117, the update state information on the firmware 118a that is used by the optical power control unit 116 to execute optical power control (Step S102).

The control frame notifying unit 115 acquires the value of the optical power of each wavelength from the detection result obtained by the OCM 114 (Step S103).

The control frame notifying unit 115 acquires device-by-wavelength identification information, which is the identification information for identifying the reconfigurable optical add/drop multiplexers 10a to 10n at the upstream side that have sent signal light of each wavelength, from an internal memory or the like in which the device-by-wavelength identification information is stored in advance (Step S104).

The control frame notifying unit 115 creates a control frame in which the acquired update state information on the firmware 118a, the value of the optical power of each wavelength, and the device-by-wavelength identification information are included (Step S105).

The control frame notifying unit 115 notifies the reconfigurable optical add/drop multiplexers 10a to 10n at the upstream side of the created control frame via the communication line 15, such as a LAN or the like (Step S106).

FIG. 11 is a flowchart illustrating an optical power control process performed by the optical add module according to the embodiment. The optical power control process illustrated in FIG. 11 is a process for, for example, controlling the amount of attenuation in the WSS performed by the optical add module 11 in the reconfigurable optical add/drop multiplexer 10a at the upstream side that has received the control frame sent from the reconfigurable optical add/drop multiplexer 10 at the downstream side.

As illustrated in FIG. 11, the optical power control unit 116 in the optical add module 11 in the reconfigurable optical add/drop multiplexer 10a at the upstream side acquires the update state information that is included in the received control frame (Step S201). The optical power control unit 116 determines whether the update state information in the control frame indicates "updating" (Step S202).

If it is determined that the update state information in the control frame sent from the reconfigurable optical add/drop multiplexer 10 at the downstream side indicates "not updating" (No at Step S202), it means the optical power control in the reconfigurable optical add/drop multiplexer 10 at the downstream side is being executed. Consequently, the optical power control unit 116 performs the following process. Namely, the optical power control unit 116 discards the control frame (Step S203); calculates the amount of attenuation in the WSS 112 on the basis of the value of the optical power of each wavelength that is output, as the detection result, from the OCM 114 (Step S204); and proceeds to Step S212.

In contrast, if it is determined that the update state information in the control frame sent from the reconfigurable optical add/drop multiplexer 10 at the downstream side indicates "updating" (Yes at Step S202), it means the optical power control in the reconfigurable optical add/drop multiplexer 10 at the downstream side is being stopped. Consequently, the optical power control unit 116 performs the following process. Namely, the optical power control unit 116 selects a single piece of device-by-wavelength identification information in the control frame (Step S205) and determines whether the selected device-by-wavelength identification information corresponds to the identification information on the reconfigurable optical add/drop multiplexer 10a (Step S206).

If it is determined that the device-by-wavelength identification information corresponds to the identification information on the reconfigurable optical add/drop multiplexer 10a (Yes at Step S207), the optical power control unit 116 acquires, from the control frame, the value of the optical power of each wavelength that is associated with the device-by-wavelength identification information (Step S208). Then, the optical power control unit 116 calculates the amount of attenuation in the WSS 112 on the basis of the value of the optical power of each wavelength that is acquired from the control frame (Step S209). When the optical power control unit 116 has not selected all the pieces of the device-by-wavelength identification information in the control frame (No at Step S210), the optical power control unit 116 returns to Step S205. When the optical power control unit 116 has selected all the pieces of the device-by-wavelength identification information in the control frame (Yes at Step S210), the optical power control unit 116 proceeds to Step S212.

If the device-by-wavelength identification information does not correspond to the identification information on the reconfigurable optical add/drop multiplexer 10a (No at Step S207), the optical power control unit 116 calculates the amount of attenuation in the WSS 112 on the basis of the detection result performed by the OCM 114 (Step S211) and proceeds to Step S210.

Then, the optical power control unit 116 sets the attenuation in the WSS 112 to the calculated amount that was calculated at one of Steps S204, S209, and S211 (Step S212).

As described above, with the reconfigurable optical add/drop multiplexers 10 and 10a to 10n according to the embodiment, a reconfigurable optical add/drop multiplexer at the downstream side notifies a reconfigurable optical add/drop multiplexer at the upstream side of a control frame that includes therein both the value of the optical power of each wavelength detected by the OCM 114 and the update state information on the firmware that controls the amount of attenuation in the WSS 112. When the update state information in the control frame sent from the reconfigurable optical add/drop multiplexer at the downstream side indicates "updating", the reconfigurable optical add/drop multiplexers 10 and 10a to 10n calculate the amount of attenuation in the WSS 112 on the basis of the value of the optical power of each wavelength in the control frame and sets the attenuation in the WSS 112 to the calculated amount. Accordingly, the reconfigurable optical add/drop multiplexers 10 and 10a to 10n according to the embodiment can maintain the value of the optical power of each wavelength in the wavelength multiplexed light at their target values even when the control of the WSS 112 in the reconfigurable optical add/drop multiplexer that is located downstream of the subject multiplexer has been stopped. Consequently, according to the embodiment, it possible to maintain the stability of communication even when the control of the WSS 112 has been stopped.

Furthermore, in the embodiment, the control frame further includes the device-by-wavelength identification information, which is identification information on the reconfigurable optical add/drop multiplexer at the upstream side that has sent the signal light of each wavelength and which is associated with the value of the optical power of each wavelength. When the update state information in the control frame indicates "updating", each of the reconfigurable optical add/drop multiplexers 10 and 10a to 10n according to the embodiment determine whether it is itself the device that is indicated by the device-by-wavelength identification information in the control frame. When it is determined that one or more of the devices is itself the device that is indicated by the device-by-wavelength identification information, each of the reconfigurable optical add/drop multiplexers 10 and 10a to 10n acquires, from the control frame, the value of the optical power of each wavelength associated with the device-by-wavelength identification information and then calculates the amount of attenuation in the WSS 112 on the basis of the value of the optical power of each acquired wavelength. When it is determined that none of the devices are the device itself that is indicated by the device-by-wavelength identification information, each of the reconfigurable optical add/drop multiplexers 10 and 10a to 10n calculates the amount of attenuation in the WSS 112 on the basis of the value of the optical power of each wavelength detected by the OCM 114. Consequently, with the reconfigurable optical add/drop multiplexers 10 and 10a to 10n according to the embodiment, even when control of the WSS 112 performed by the reconfigurable optical add/drop multiplexer at the downstream side has been stopped, it is possible to adjust the optical power of each wavelength for each reconfigurable optical add/drop multiplexer at the upstream side that has sent the signal light of each wavelength in the wavelength multiplexed light. Consequently, according to the embodiment, even when the control of the WSS 112 is stopped, it is possible to allow the multiple reconfigurable optical add/drop multiplexers at the upstream side to adjust, in a shared manner, the optical power of each wavelength in the wavelength multiplexed light. This makes it possible to maintain the stability of communication more accurately.

Furthermore, with the reconfigurable optical add/drop multiplexers 10 and 10a to 10n according to the embodiment, when the firmware that controls the amount of attenuation in the WSS 112 is updated, the reconfigurable optical add/drop multiplexer at the downstream side notifies the reconfigurable optical add/drop multiplexers at the upstream side of the control frame that includes the update state information indicating that the firmware is being updated. Consequently, according to the embodiment, even when the control of the WSS 112 is stopped due to the updating of the firmware, the stability of the communication can be maintained.

Furthermore, with the reconfigurable optical add/drop multiplexers 10 and 10a to 10n according to the embodiment, when the firmware has been updated, the reconfigurable optical add/drop multiplexer at the downstream side notifies the reconfigurable optical add/drop multiplexers at the upstream side of the control frame that includes the update state information indicating that the firmware is not being updated. With the reconfigurable optical add/drop multiplexers 10 and 10a to 10n, after a control frame that includes update state information that indicates "not updating" is received from the reconfigurable optical add/drop multiplexer at the downstream side and then a control frame that includes update state information that indicates "updating" is received, the subject multiplexer performs the following process. Namely, the reconfigurable optical add/drop multiplexers 10 and 10a to 10n calculate the amount of attenuation in the WSS 112 on the basis of the value of the optical power of each wavelength detected by the OCM 114 and sets, for each predetermined wavelength, the attenuation in the WSS 112 to the calculated amount so that the optical power of each wavelength can be gradually adjusted. Consequently, according to the embodiment, it is possible to reduce sudden variation of the optical power of each wavelength, which makes it possible to avoid the occurrence of a communication failure due to sudden variation of the optical power.

According to an aspect of an embodiment of the optical transmission device disclosed in the present invention, an advantage is provided in that, even when control of the optical device has been stopped, the stability of communication can be maintained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device comprising:
a detecting unit that detects a value of optical power of each of multiple wavelengths in wavelength multiplexed light that is targeted for transmission;
a notifying unit that notifies an optical transmission device at an upstream side that has sent signal light of each of the wavelengths of a control frame that includes the value of the optical power of each of the wavelengths detected by the detecting unit and that includes information that indicates an execution state of optical power control that controls an adjustment level set in an optical device that adjusts the optical power of each of the wavelengths; and
a control unit that calculates the adjustment level on the basis of the value of the optical power of each of the wavelengths detected by the detecting unit, that calculates, when the information included in a control frame sent from an optical transmission device at a downstream side indicates that the optical power control is being stopped, the adjustment level of the optical power of each of the wavelengths included in the control frame, and that sets the calculated adjustment level to the optical device so that the control unit executes the optical power control, wherein
the control frame sent from the optical transmission device at the downstream side to the optical transmission device further includes device-by-wavelength identification information that is identification information on the optical transmission device at the upstream side that has sent the signal light of each of the wavelengths by associating the device-by-wavelength identification information with the value of the optical power of each of the wavelengths,
when the information included in the control frame sent from the optical transmission device at the downstream side to the optical transmission device indicates that the optical power control is being stopped, the control unit determines whether the device-by-wavelength identification information included in the control frame sent from the optical transmission device at the downstream side to the optical transmission device corresponds to the identification information on the optical transmission device,
when the device-by-wavelength identification information corresponds to the identification information on the optical transmission device, the control unit acquires, from the control frame sent from the optical transmission device at the downstream side to the optical transmission device, the value of the optical power of each of the wavelengths associated with the device-by-wavelength identification information and calculates the adjustment level on the basis of the acquired value of the optical power of each of the wavelengths, and
when the device-by-wavelength identification information does not correspond to the identification information on the optical transmission device, the control unit calculates the adjustment level on the basis of the value of the optical power of each of the wavelengths detected by the detecting unit.

2. The optical transmission device according to claim 1, further comprising an updating unit that updates firmware, wherein, when the firmware is updated by the updating unit, the notifying unit notifies the optical transmission device at the upstream side of the control frame that includes the information indicating that the optical power control is being stopped.

3. The optical transmission device according to claim 2, wherein when the firmware has been updated by the updating unit, the notifying unit notifies the optical transmission device at the upstream side of the control frame that includes the information indicating that the optical power control is being executed, and
after the control unit receives the control frame that includes the information indicating that the optical power control is being stopped from the optical transmission device at the downstream side, when the control unit then receives the control frame that includes the information indicating that the optical power control is being executed from the optical transmission device at the downstream side, the control unit calculates the adjustment level on the basis of the value of the optical power of each of the wavelengths detected by the detecting unit and sets the calculated adjustment level to the optical device, by predetermined level, so that the control unit gradually adjusts the optical power of each of the wavelengths.

4. An optical transmission device control method comprising:
notifying, by using a detecting unit that detects a value of optical power of each of multiple wavelengths in wavelength multiplexed light that is targeted for transmission, an optical transmission device at an upstream side that has sent signal light of each of the wavelengths of a control frame that includes the detected value of the optical power of each of the wavelengths and that includes information that indicates an execution state of optical power control that controls an adjustment level set in an optical device that adjusts the optical power of each of the wavelengths;
first calculating the adjustment level on the basis of the detected value of the optical power of each of the wavelengths;
second calculating the adjustment level on the basis of the value of the optical power of each of the wavelengths included in the control frame when the information included in a control frame sent from an optical transmission device at a downstream side indicates that the optical power control is being stopped; and
executing the optical power control by setting the calculated adjustment level to the optical device, wherein
the control frame sent from the optical transmission device at the downstream side to the optical transmission device further includes device-by-wavelength identification information that is identification information on the optical transmission device at the upstream side that has sent the signal light of each of the wavelengths by associating the device-by-wavelength identification information with the value of the optical power of each of the wavelengths, the optical transmission device control method further comprises, when the information included in the control frame sent from the optical transmission device at the downstream side to the optical transmission device indicates that the optical power control is being stopped, determining whether the device-by-wavelength identification information included in the control frame sent from the optical transmission device at the downstream side to the optical transmission device corresponds to the identification information on the optical transmission device, when the device-by-wavelength identification information corresponds to the identification information on the optical transmission device, the second calculating includes acquiring, from the control frame sent from the optical transmission device at the downstream side to the optical transmission device, the value of the optical power of each of the wavelengths associated with the device-by-wavelength identification information and calculating the adjustment level on the basis of the acquired value of the optical power of each of the wavelengths, and when the device-by-wavelength identification information does not correspond to the identification information on the optical transmission device, the first calculating includes calculating the adjustment level on the basis of the value of the optical power of each of the wavelengths detected by the detecting unit.

* * * * *